(12) United States Patent
Nassoy et al.

(10) Patent No.: US 12,444,768 B2
(45) Date of Patent: Oct. 14, 2025

(54) INORGANIC COMPOUNDS HAVING AN ARGYRODITE-TYPE STRUCTURE, THEIR PREPARATION PROCESSES AND THEIR USES IN ELECTROCHEMICAL APPLICATIONS

(71) Applicant: HYDRO-QUÉBEC, Montréal (CA)

(72) Inventors: Fabien Nassoy, Boucherville (CA); Benoît Fleutot, Boucherville (CA); Marc-André Girard, Montréal (CA); Steve Duchesne, Montréal (CA); Catherine Gagnon, Sainte-Julie (CA); Alexis Perea, Montréal (CA); David Rozon, Montréal (CA); Sergey Krachkovskiy, Boucherville (CA)

(73) Assignee: HYDRO-QUÉBEC, Montréal (CA)

( * ) Notice: Subject to any disclaimer, the term of this patent is extended or adjusted under 35 U.S.C. 154(b) by 0 days.

(21) Appl. No.: 18/050,119

(22) Filed: Oct. 27, 2022

(65) Prior Publication Data
US 2023/0132005 A1   Apr. 27, 2023

(30) Foreign Application Priority Data

Oct. 27, 2021  (CA) ................................ CA 3136069
Oct. 12, 2022  (CA) ................................ CA 3179099

(51) Int. Cl.
*H01M 10/0562*   (2010.01)
*H01M 4/04*   (2006.01)

(52) U.S. Cl.
CPC ..... *H01M 10/0562* (2013.01); *H01M 4/0404* (2013.01); *H01M 2300/0068* (2013.01)

(58) Field of Classification Search
CPC .......... H01M 10/0562; H01M 4/0404; H01M 2300/0068; H01M 4/04; H01M 4/13;
(Continued)

(56) References Cited

U.S. PATENT DOCUMENTS 5,677,081 A  10/1997  Iwamoto et al.
7,273,682 B2  9/2007  Park et al.
(Continued)

FOREIGN PATENT DOCUMENTS

CN  109638347   *  4/2019
CN  109638347 A     4/2019
(Continued)

OTHER PUBLICATIONS

English Translation of KR 20180000087 (Year: 2018).*
(Continued)

*Primary Examiner* — Lisa S Park
(74) *Attorney, Agent, or Firm* — Womble Bond Dickinson (US) LLP

(57) ABSTRACT

The present technology relates to inorganic compounds having an argyrodite-type structure based on an alkali metal obtained by a preparation process comprising a step of grinding the sulfide of the alkali metal, the sulfate of the alkali metal, phosphorus pentasulfide and a halide of the alkali metal. Also described are electrode materials, electrodes, electrolytes comprising said inorganic compound having an argyrodite-type structure and their uses in electrochemical cells, for example, in electrochemical accumulators, particularly in all-solid-state batteries.

6 Claims, 12 Drawing Sheets

(58) Field of Classification Search
CPC .. H01M 4/62; H01M 10/056; H01M 10/0567; H01M 10/052; H01M 10/0525; H01M 10/054; C01B 17/22; C01B 25/14; C01B 25/16; H01B 1/10; Y02E 60/10

See application file for complete search history.

(56) References Cited

U.S. PATENT DOCUMENTS

| | | |
|---|---|---|
| 10,811,726 B2 | 10/2020 | Aihara et al. |
| 2011/0081580 A1 | 4/2011 | Stadler et al. |
| 2016/0293946 A1 | 10/2016 | Ritter et al. |
| 2020/0087155 A1 | 3/2020 | Rupert |
| 2021/0119247 A1 | 4/2021 | Kim et al. |
| 2021/0135280 A1* | 5/2021 | Lee .................. H01M 4/134 |
| 2021/0234158 A1 | 7/2021 | Washida et al. |

FOREIGN PATENT DOCUMENTS

| | | |
|---|---|---|
| CN | 110372367 A | 10/2019 |
| CN | 110492172 A | 11/2019 |
| CN | 111244534 A | 6/2020 |
| CN | 112777632 A | 5/2022 |
| EP | 4113688 A1 | 1/2023 |
| JP | 6139864 B2 | 5/2017 |
| KR | 20180000087 A | 1/2018 |
| KR | 20210057271 A | 5/2021 |
| WO | 2003063287 | 7/2003 |
| WO | 2004068610 | 8/2004 |
| WO | 2009111860 | 9/2009 |
| WO | 2019107879 | 6/2019 |
| WO | 2020033809 A1 | 2/2020 |
| WO | 2021010479 A1 | 1/2021 |
| WO | 2021191217 | 9/2021 |
| WO | 2022065855 | 3/2022 |
| WO | 2023053609 A1 | 4/2023 |

OTHER PUBLICATIONS

English Translation of DE 102018203161 (Year: 2019).*

Choi, Sunho, et al. "Effect of Li2SO4 on the properties of Li2S—P2S5 glass-ceramic solid electrolytes." Ceramics International 42.6 (2016): 6738-6742.

Yu, Chuang, et al. "Synthesis, structure and electrochemical performance of the argyrodite Li6PS5Cl solid electrolyte for Li-ion solid state batteries." Electrochimica Acta 215 (2016): 93-99.

Wenzel, Sebastian, et al. "Interfacial reactivity and interphase growth of argyrodite solid electrolytes at lithium metal electrodes." Solid State Ionics 318 (2018): 102-112.

Zhang, Zhixia, et al. "Synthesis and characterization of argyrodite solid electrolytes for all-solid-state Li-ion batteries." Journal of Alloys and Compounds 747 (2018): 227-235.

Kudu, Ömer Ulaş, et al. "A review of structural properties and synthesis methods of solid electrolyte materials in the Li2S—P2S5 binary system." Journal of Power Sources 407 (2018): 31-43.

Ziolkowska, Dominika A., et al. "Rapid and economic synthesis of a Li7PS6 solid electrolyte from a liquid approach." ACS applied materials & interfaces 11.6 (2019): 6015-6021.

Zhang, Zhuoran, et al. "Enhancing ionic conductivity of solid electrolyte by lithium substitution in halogenated Li-argyrodite." Journal of Power Sources 450 (2020): 227601.

Reddy, Mogalahalli V., et al. "Sulfide and oxide inorganic solid electrolytes for all-solid-state Li batteries: A Review." Nanomaterials 10.8 (2020): 1606.

Li, Yang, et al. "Interface stability of LiCl-rich argyrodite Li6PS5Cl with propylene carbonate boosts high-performance lithium batteries." Electrochimica Acta 363 (2020): 137128.

Yoon, Da Hye, and Yong Joon Park. "Electrochemical Properties of Cathode according to the Type of Sulfide Electrolyte and the Application of Surface Coating." Journal of Electrochemical Science and Technology 12.1 (2021): 126-136.

Inoue et al. "Synthesis and structure of novel lithium-ion conductor Li7Ge3PS12" Journal of Solid State Chemistry, vol. 246, Feb. 2017, pp. 334-340.

Wang et al. "All-solid-state lithium batteries enabled by sulfide electrolytes: from fundamental research to practical engineering design" Energy & Environmental Science, vol. 14, Issue 5, Apr. 2021, pp. 2577-2619.

Deiseroth et al. "Li7PS6 and Li6PS5X (X: Cl, Br, I): Possible Three-dimensional Diffusion Pathways for Lithium Ions and Temperature Dependence of the Ionic Conductivity by Impedance Measurements" Zeitschrift für anorganische und allgemeine Chemie. vol. 637, Issue 10, Aug. 2011, pp. 1287-1294.

Kanno et al. "Synthesis of a new lithium ionic conductor, thio-LISICON-lithium germanium sulfide system" Solid State Ionics, vol. 130, Issue 1-2, May 2000, pp. 97-104.

Chen et al. "Sulfide solid electrolytes for all-solid-state lithium batteries: Structure, conductivity, stability and application" Energy Storage Materials, vol. 14, Sep. 2018, pp. 58-74.

* cited by examiner

INORGANIC COMPOUNDS HAVING AN ARGYRODITE-TYPE STRUCTURE, THEIR PREPARATION PROCESSES AND THEIR USES IN ELECTROCHEMICAL APPLICATIONS

RELATED APPLICATIONS

This application claims priority under applicable law to Canadian Patent Application No. 3,136,069 filed on Oct. 27, 2021, and Canadian Patent Application entitled "COMPOSÉS INORGANIQUES POSSÉDANT UNE STRUCTURE DE TYPE ARGYRODITE, LEURS PROCÉDÉS DE PRÉPARATION ET LEURS UTILISATIONS DANS DES APPLICATIONS ÉLECTROCHIMIQUES" filed on Oct. 12, 2022, the contents of which are incorporated herein by reference in their entirety and for all purposes.

TECHNICAL FIELD

The present application relates to the field of inorganic oxysulfide-based compounds having an argyrodite-type structure and to their uses in electrochemical applications. More particularly, the present application relates to the field of oxysulfide-based inorganic compounds having an argyrodite-type structure, to electrode materials and solid electrolytes comprising them, to their manufacturing processes and to their uses in electrochemical cells, particularly in all-solid-state-batteries.

BACKGROUND

Inorganic compounds such as sulfide-based ceramics, glasses and glass-ceramics are promising materials for many technological applications since they allow the development of all-solid-state electrochemical systems that are substantially safer.

Moreover, inorganic sulfide-based compounds exhibit a wide electrochemical stability window and substantially higher ionic conductivity at room temperature. Indeed, inorganic solid electrolytes comprising them exhibit ionic conductivities at room temperature comparable to those of liquid organic electrolytes, and thus, substantially higher than those of their counterparts based on the use of solid polymer electrolytes. For example, argyrodite of formula $Li_6PS_5X$ (wherein, X is Cl, Br or I) has an ionic conductivity at room temperature in the mS·cm$^{-1}$ range.

However, the use of inorganic compounds of the argyrodite type is limited by their high production cost, in particular due to the use of lithium sulfide ($Li_2S$) as a precursor and source of sulfur, and to a high temperature annealing step allowing to obtain interesting ionic conductivities. One of the key elements of industrial requirements related to the production of this type of inorganic compounds is therefore to minimize the costs by lowering the $Li_2S$ utilization rate and the annealing temperature while maintaining a considerably high ionic conductivity.

In addition, argyrodite-type inorganic compounds are associated with problems related to their interfacial stability as well as their stability in ambient air and humidity. More precisely, these inorganic solid electrolytes generate hydrogen sulfide ($H_2S$) gas when in contact with humid air and must therefore be prepared, assembled, and operated under an inert atmosphere. One strategy employed to solve this problem comprises the use of an inorganic argyrodite compound based on oxysulfide. Indeed, a partial atomic substitution of sulfur and/or lithium in these inorganic compounds by oxygen would lead to a significant decrease in $H_2S$ generation in the presence of humidity.

Consequently, there is still a need for the development of inorganic compounds for use in all-solid-state electrochemical systems excluding one or more of the drawbacks mentioned above.

SUMMARY

According to some aspects, embodiments of the technology as described herein include the following items:

1. A process for preparing an inorganic compound having an argyrodite-type structure based on an alkali metal, the process comprising a step of grinding sulfide of the alkali metal, sulfate of the alkali metal, phosphorus pentasulfide and a halide of the alkali metal, wherein the alkali metal is selected from lithium, sodium and potassium, for example, the alkali metal is lithium.
2. The process of item 1, wherein the halide of the alkali metal is selected from the fluoride of the alkali metal, the chloride of the alkali metal, the bromide of the alkali metal, the iodide of the alkali metal, and a mixture of at least two thereof.
3. The process of item 2, wherein the halide of the alkali metal is the chloride of the alkali metal.
4. The process of item 2, wherein the halide of the alkali metal is the bromide of the alkali metal.
5. The process of item 2, wherein the halide of the alkali metal is the iodide of the alkali metal.
6. The process of item 2, wherein the halide of the alkali metal is a mixture of the chloride of the alkali metal and the bromide of the alkali metal.
7. The process of item 2, wherein the halide of the alkali metal is a mixture of the chloride of the alkali metal, the bromide of the alkali metal, and the iodide of the alkali metal.
8. The process of any one of items 1 to 7, wherein the argyrodite-type structure is of formula $M_{6-x}PS_{5-x-y}O_yZ_{1+x}$, wherein M is the alkali metal selected from Li, Na, and K, for example, M is Li, Z is a halogen atom selected from F, Cl, Br, and I, x represents the number of Z in excess of 1 or is equal to zero, and y is a number different from zero (for example, $0 \leq x \leq 1$ and $0 < y \leq 1$).
9. The process of item 8, wherein x is a number different from zero (for example, $0 < x \leq 1$).
10. The process of item 8 or 9, wherein x and y are selected to achieve electroneutrality.
11. The process of any one of items 8 to 10, wherein the argyrodite-type structure is selected from inorganic compounds having an argyrodite-type structure of formulae $M_{5.4}PS_{4.3}O_{0.1}Cl_{1.6}$, $M_{5.4}PS_{4.1}O_{0.3}Cl_{1.6}$, $M_{5.4}PS_{3.9}O_{0.5}Cl_{1.6}$, $M_{5.4}PS_{3.65}O_{0.75}Cl_{1.6}$, $M_{5.7}PS_{4.4}O_{0.3}Cl_{1.3}$, $M_{5.4}PS_{4.1}O_{0.3}Cl_{1.6}$, $M_{5.4}PS_{3.9}O_{0.5}Cl_{1.6}$, $M_{5.4}PS_{4.1}O_{0.3}Br_{1.6}$, $M_{5.4}PS_{4.1}O_{0.3}ClBr_{0.6}$, $M_{5.4}PS_{4.1}O_{0.3}Cl_{0.8}Br_{0.8}$, $M_{5.4}PS_{4.1}O_{0.3}Cl_{0.6}Br$, $M_{5.4}PS_{4.1}O_{0.3}ClBr_{0.5}I_{0.1}$, $M_{5.4}PS_{4.1}O_{0.3}Cl_{0.75}Br_{0.75}I_{0.1}$, $M_{5.4}PS_{4.1}O_{0.3}Cl_{0.7}Br_{0.7}I_{0.2}$, and $M_{5.4}PS_{4.1}O_{0.3}ClBr_{0.4}I_{0.2}$, wherein M is as defined in item 8.
12. The process of any one of items 8 to 10, wherein the argyrodite-type structure is selected from inorganic compounds having an argyrodite-type structure of formulae $Li_{5.4}PS_{4.3}O_{0.1}Cl_{1.6}$, $Li_{5.4}PS_{4.1}O_{0.3}Cl_{1.6}$, $Li_{5.4}PS_{3.9}O_{0.5}Cl_{1.6}$, $Li_{5.4}PS_{3.65}O_{0.75}Cl_{1.6}$, $Li_{5.7}PS_{4.4}O_{0.3}Cl_{1.3}$, $Li_{5.4}PS_{4.1}O_{0.3}Cl_{1.6}$, $Li_{5.4}PS_{3.9}O_{0.5}Cl_{1.6}$, $Li_{5.4}PS_{4.1}O_{0.3}Br_{1.6}$, $Li_{5.4}PS_{4.1}O_{0.3}ClBr_{0.6}$, $Li_{5.4}PS_{4.1}O_{0.3}Cl_{0.8}Br_{0.8}$, $Li_{5.4}PS_{4.1}O_{0.3}Cl_{0.6}Br$, $Li_{5.4}PS_{4.1}O_{0.3}ClBr_{0.5}I_{0.1}$, $Li_{5.4}PS_{4.1}O_{0.3}Cl_{0.75}Br_{0.75}I_{0.1}$, $Li_{5.4}PS_{4.1}O_{0.3}Cl_{0.7}Br_{0.7}I_{0.2}$, and $Li_{5.4}PS_{4.1}O_{0.3}ClBr_{0.4}I_{0.2}$.

13. The process of any one of items 1 to 7, wherein the argyrodite-type structure is of formula $M_{6-x-2y}PS_{5-x-y}O_yZ_{1+x}$, wherein M is the alkali metal selected from Li, Na, and K, for example, M is Li, Z is a halogen atom selected from F, Cl, Br, and I, x represents the number of Z in excess of 1 or is equal to zero, and y is a number different from zero (for example, $0 \leq x \leq 1$ and $0 < y \leq 1$).

14. The process of item 13, wherein x is a number different from zero (for example, $0 < x \leq 1$).

15. The process of item 13 or 14, wherein the argyrodite-type structure is selected from inorganic compounds having an argyrodite-type structure of formulae $M_{5.2}PS_{4.3}O_{0.1}Cl_{1.6}$, $M_{5.1}PS_{4.4}O_{0.3}Cl_{1.3}$, and $M_{4.8}PS_{4.1}O_{0.3}Cl_{1.6}$, wherein M is as defined in item 13.

16. The process of item 15, wherein the argyrodite-type structure is selected from inorganic compounds having an argyrodite-type structure of formulae $Li_{5.2}PS_{4.3}O_{0.1}Cl_{1.6}$, $Li_{5.1}PS_{4.4}O_{0.3}Cl_{1.3}$, and $Li_{4.8}PS_{4.1}O_{0.3}Cl_{1.6}$.

17. The process of any one of items 1 to 16, wherein the grinding step is performed using a mill.

18. The process of item 17, wherein the mill is a planetary mill.

19. The process of any one of items 1 to 18, wherein the grinding step is performed at a rotational speed in the range of from about 300 rpm to about 800 rpm.

20. The process of any one of items 1 to 18, wherein the grinding step is performed at a rotational speed in the range of from about 400 rpm to about 700 rpm.

21. The process of any one of items 1 to 18, wherein the grinding step is performed at a rotational speed in the range of from about 500 rpm to about 700 rpm.

22. The process of any one of items 1 to 18, wherein the grinding step is performed at a rotational speed of about 600 rpm.

23. The process of any one of items 1 to 22, wherein the grinding step is performed for a time in the range of from about 5 hours to about 20 hours.

24. The process of any one of items 1 to 22, wherein the grinding step is performed for about 10 hours.

25. The process of any one of items 1 to 24, wherein the grinding step is performed in a milling bead:precursor ratio in the range of from about 10 to about 30.

26. The process of any one of items 1 to 24, wherein the grinding step is performed in a milling bead:precursor ratio of about 30.

27. The process of any one of items 1 to 26, further comprising an annealing step performed at a maximum temperature of about 400° C.

28. The process of any one of items 1 to 26, further comprising an annealing step performed at a maximum temperature of about 300° C.

29. The process of any one of items 1 to 26, which is free of an annealing step.

30. An inorganic compound having an argyrodite-type structure obtained by the process as defined in any one of items 1 to 29.

31. An electrode material comprising an electrochemically active material and an inorganic compound having an argyrodite-type structure as defined in item 30 or obtained by the process as defined in any one of items 1 to 29.

32. The electrode material of item 31, wherein the inorganic compound having an argyrodite-type structure is present as an additive.

33. The electrode material of item 31 or 32, wherein the inorganic compound having an argyrodite-type structure is present as a coating material.

34. The electrode material of item 33, wherein the coating material forms a coating layer on the surface of the electrochemically active material.

35. The electrode material of any one of items 31 to 34, wherein the electrochemically active material is selected from a metal oxide, a metal sulfide, a metal oxysulfide, a metal phosphate, a metal fluorophosphate, a metal oxyfluorophosphate, a metal sulfate, a metal halide, a metal fluoride, sulfur, selenium, and a combination of at least two thereof.

36. The electrode material of item 35, wherein the metal of the electrochemically active material is selected from titanium (Ti), iron (Fe), manganese (Mn), vanadium (V), nickel (Ni), cobalt (Co), aluminum (Al), chromium (Cr), copper (Cu), zirconium (Zr), niobium (Nb), molybdenum (Mo), tungsten (W), and a combination of at least two thereof.

37. The electrode material of item 35 or 36, wherein the metal of the electrochemically active material further comprises an alkali or alkaline earth metal selected from lithium (Li), sodium (Na), potassium (K), and magnesium (Mg).

38. The electrode material of any one of items 31 to 37, wherein the electrochemically active material is a lithium metal oxide.

39. The electrode material of item 38, wherein the lithium metal oxide is a mixed oxide of lithium, nickel, manganese and cobalt (NCM).

40. The electrode material of any one of items 31 to 34, wherein the electrochemically active material is selected from a non-alkali or non-alkaline earth metal, an intermetallic compound, a metal oxide, a metal nitride, a metal phosphide, a metal phosphate, a metal halide, a metal fluoride, a metal sulfide, a metal oxysulfide, a carbon, silicon (Si), a silicon-carbon composite (Si—C), a silicon oxide ($SiO_x$), a silicon oxide-carbon composite ($SiO_x$—C), tin (Sn), a tin-carbon composite (Sn—C), a tin oxide ($SnO_x$), tin oxide-carbon composite ($SnO_x$—C), and a combination of at least two thereof.

41. The electrode material of any one of items 31 to 40, wherein the electrochemically active material further comprises a doping element.

42. The electrode material of any one of items 31 to 41, wherein the electrochemically active material further comprises a coating material.

43. The electrode material of item 42, wherein the coating material is an electronically conductive material.

44. The electrode material of item 43, wherein the electronically conductive material is carbon.

45. The electrode material of item 42, wherein the coating material is selected from $Li_2SiO_3$, $LiTaO_3$, $LiAlO_2$, $Li_2O$—$ZrO_2$, $LiNbO_3$, other similar coating materials, and a combination of at least two thereof.

46. The electrode material of item 45, wherein the coating material is $LiNbO_3$.

47. The electrode material of any one of items 31 to 46, further comprising at least one electronically conductive material.

48. The electrode material of item 47, wherein the electronically conductive material is selected from the group consisting of carbon black, acetylene black, graphite, graphene, carbon fibers, carbon nanofibers, carbon nanotubes, and a mixture of at least two thereof.
49. The electrode material of item 48, wherein the electronically conductive material is a mixture of carbon black and vapor grown carbon fibers (VGCFs).
50. The electrode material of any one of items 31 to 49, further comprising at least one additive.
51. The electrode material of item 50, wherein the additive is selected from inorganic ionic conductive materials, inorganic materials, glasses, glass-ceramics, ceramics, nano-ceramics, salts, and a combination of at least two thereof.
52. The electrode material of any one of items 31 to 51, further comprising a binder.
53. The electrode material of item 52, wherein the binder is selected from the group consisting of a polymer binder of the polyether, polycarbonate or polyester type, a fluorinated polymer, and a water-soluble binder.
54. An electrode comprising the electrode material as defined in any one of items 31 to 53 on a current collector.
55. A self-supported electrode comprising the electrode material as defined in any one of items 31 to 53.
56. An electrolyte comprising an inorganic compound having an argyrodite-type structure as defined in item 30 or obtained by the process as defined in any one of items 1 to 29.
57. The electrolyte of item 56, wherein said electrolyte is a liquid electrolyte comprising a salt in a solvent.
58. The electrolyte of item 56, wherein said electrolyte is a gel electrolyte comprising a salt in a solvent and optionally a solvating polymer.
59. The electrolyte of item 56, wherein said electrolyte is a solid polymer electrolyte comprising a salt in a solvating polymer.
60. The electrolyte of any one of items 56 to 59, wherein the inorganic compound having an argyrodite-type structure is present as an additive.
61. The electrolyte of item 56, wherein said electrolyte is an inorganic solid electrolyte.
62. The electrolyte of item 56, wherein said electrolyte is a polymer-ceramic hybrid solid electrolyte.
63. The electrolyte of item 61 or 62, wherein the inorganic compound having an argyrodite-type structure is present as the inorganic solid electrolyte material.
64. The electrolyte of any one of items 56 to 63, further comprising at least one additional component.
65. The electrolyte of item 64, wherein the additional component is selected from ionic conductive materials, inorganic particles, glass or ceramic particles, and a combination of at least two thereof.
66. An electrochemical cell comprising a negative electrode, a positive electrode, and an electrolyte, wherein at least one of the positive electrode or the negative electrode is as defined in item 54 or 55 or comprises an electrode material as defined in any one of items 31 to 53.
67. An electrochemical cell comprising a negative electrode, a positive electrode and an electrolyte, wherein the electrolyte is as defined in any one of items 56 to 65.
68. The electrochemical cell of item 66 or 67, wherein the negative electrode comprises an electrochemically active material comprising an alkali metal, an alkaline earth metal, an alloy comprising at least one alkali or alkaline earth metal, a non-alkali and non-alkaline earth metal, or an alloy or an intermetallic compound.
69. The electrochemical cell of item 68, wherein the electrochemically active material of the negative electrode comprises metallic lithium or an alloy including or based on metallic lithium.
70. The electrochemical cell of any one of items 66 to 68, wherein the positive electrode is pre-lithiated and the negative electrode is substantially free of lithium.
71. The electrochemical cell of item 70, wherein the negative electrode is lithiated in situ during cycling of said electrochemical cell.
72. An electrochemical accumulator comprising at least one electrochemical cell as defined in any one of items 66 to 71.
73. The electrochemical accumulator of item 72, wherein said electrochemical accumulator is a battery selected from a lithium battery, a lithium-ion battery, a sodium battery, a sodium-ion battery, a magnesium battery, and a magnesium-ion battery.
74. The electrochemical accumulator of item 73, wherein said battery is a lithium battery or a lithium-ion battery.
75. The electrochemical accumulator of any one of items 72 to 74, wherein said electrochemical accumulator is an all-solid-state battery.

DETAILED DESCRIPTION

Figure 1:
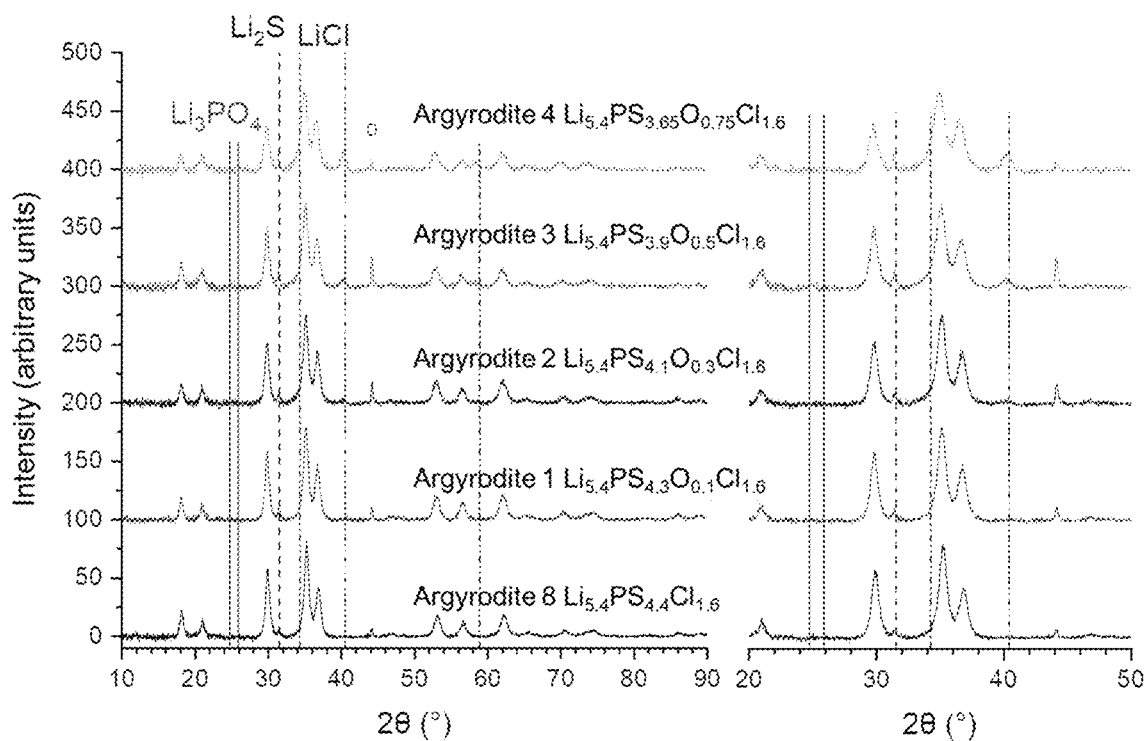
FIG. 1 presents X-ray diffraction patterns obtained for the powders of Argyrodites 1 to 4 and 8, as described in Example 2.

The following detailed description and examples are for illustrative purposes only and should not be interpreted as further limiting the scope of the invention. On the contrary, they are intended to cover all alternatives, modifications and equivalents that can be included as defined by the present description. The objects, advantages and other features of the present inorganic compounds having an argyrodite-type structure, their preparation processes, as well as electrode materials, electrodes, electrolytes, electrochemical cells, and electrochemical accumulators comprising them will be more apparent and better understood from the following non-restrictive description and the references made to the accompanying figures.

All technical and scientific terms and expressions used herein have the same definitions as those commonly understood by the person skilled in the art relating to the present technology. The definition of some terms and expressions used herein is nevertheless provided below.

When the term "about" is used herein, it means approximately, in the region of, or around. For example, when the term "about" is used in relation to a numerical value, it modifies it by a variation of 10% above and below its nominal value. This term can also take into account, for example, the experimental error of a measuring device or rounding.

When a range of values is mentioned in the present application, the lower and upper limits of the interval are, unless otherwise indicated, always included in the definition. When a range of values is mentioned in the present application, then all intermediate ranges and subranges, as well as the individual values included in the ranges of values, are included in the definition.

When the article "a" is used to introduce an element in the present application, it does not have the meaning of "only one", but rather of "one or more". Of course, where the description states that a particular step, component, element, or feature "can" or "could" be included, that particular step, component, element, or feature is not required to be included in each embodiment.

The term "self-supported electrode" as used herein refers to an electrode without a metal current collector.

The present technology relates to a process for preparing an inorganic compound having an argyrodite-type structure based on $M_2S—P_2S_5$-$M_2SO_4$-MZ (wherein, M is an alkali metal selected from lithium (Li), sodium (Na), potassium (K), and a combination of at least two thereof, and Z is a halogen atom selected from fluorine (F), chlorine (Cl), bromine (Br) and iodine (I), or a combination of at least two thereof), the process comprising a step of direct grinding of the precursors. According to some examples, M is lithium. The precursors consist of the alkali metal sulfide ($M_2S$), the alkali metal sulfate ($M_2SO_4$), phosphorus pentasulfide ($P_2S_5$), and a halide of the alkali metal selected from the fluoride of the alkali metal, the chloride of the alkali metal, the bromide of the alkali metal, the iodide of the alkali metal, and a mixture of at least two thereof.

According to one example, the inorganic compounds possessing an argyrodite-type can be respectively of formulae $M_{6-x}PS_{5-x-y}O_yZ_{1+x}$ and $M_{6-x-2y}PS_{5-x-y}O_yZ_{1+x}$, wherein Z and M are as herein defined, x represents the number of Z in excess of 1 or is equal to zero, and y is a number different from zero, for example, $0 \le x \le 1$ and $0 < y \le 1$. According to one example, x is a number different from zero (for example, $0 < x \le 1$). Thus, inorganic compounds having an argyrodite-type structure can be obtained by grinding from the precursors as defined herein respectively according to the following reaction equations:

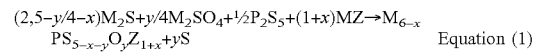

$$(2,5-y/4-x)M_2S+y/4M_2SO_4+½P_2S_5+(1+x)MZ \rightarrow M_{6-x}PS_{5-x-y}O_yZ_{1+x}+yS \quad \text{Equation (1)}$$

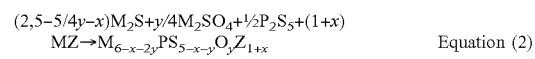

$$(2,5-5/4y-x)M_2S+y/4M_2SO_4+½P_2S_5+(1+x)MZ \rightarrow M_{6-x-2y}PS_{5-x-y}O_yZ_{1+x} \quad \text{Equation (2)}$$

wherein, x, y, M and Z are as defined herein.

According to one example, when the inorganic compound has an argyrodite-type structure, x represents the number of Z in excess of 1 or is equal to zero, y is a number different from zero, and x and y are selected to achieve a desired stoichiometry or to achieve electroneutrality. Non-limiting examples of inorganic compounds having an argyrodite-type structure according to Equation 1 include inorganic compounds having an argyrodite-type structure of formulae $M_{5.4}PS_{4.3}O_{0.1}Z_{1.6}$, $M_{5.4}PS_{4.1}O_{0.3}Z_{1.6}$, $M_{5.4}PS_{3.9}O_{0.5}Z_{1.6}$, $M_{5.4}PS_{3.65}O_{0.75}Z_{1.6}$, and $M_{5.7}PS_{4.4}O_{0.3}Z_{1.3}$, wherein M and Z are as herein defined. When the inorganic compound has an argyrodite-type structure including less of the alkali metal (i.e., an inorganic compound having an argyrodite-type structure according to Equation 2), x represents the number of Z in excess of 1 or is equal to zero, y is a number different from zero, and x and y are selected to obtain a desired stoichiometry. Non-limiting examples of inorganic compounds having an argyrodite-type structure according to Equation 2 include inorganic compounds having an argyrodite-type structure of the formulae $M_{5.1}PS_{4.4}O_{0.3}Z_{1.3}$, and $M_{4.8}PS_{4.1}O_{0.3}Z_{1.6}$, wherein M and Z are as herein defined.

According to an example of interest, Z is a chlorine atom, and the halide of the alkali metal is the chloride of the alkali metal. For example, the inorganic compound having an argyrodite-type structure can be selected from inorganic compounds having an argyrodite-type structure of formulae $M_{5.4}PS_{4.3}O_{0.1}Cl_{1.6}$, $M_{5.4}PS_{4.1}O_{0.3}Cl_{1.6}$, $M_{5.4}PS_{3.9}O_{0.5}Cl_{1.6}$, $M_{5.4}PS_{3.65}O_{0.75}Cl_{1.6}$, $M_{5.7}PS_{4.4}O_{0.3}Cl_{1.3}$, $M_{5.1}PS_{4.4}O_{0.3}Cl_{1.3}$, and $M_{4.8}PS_{4.1}O_{0.3}Cl_{1.6}$, wherein M is as herein defined.

According to another example of interest, Z is a bromine atom, and the halide of the alkali metal is the bromide of the alkali metal. For example, the inorganic compound having an argyrodite-type structure can be selected from inorganic compounds having an argyrodite-type structure of formulae $M_{5.4}PS_{4.3}O_{0.1}Br_{1.6}$, $M_{5.4}PS_{4.1}O_{0.3}Br_{1.6}$, $M_{5.4}PS_{3.9}O_{0.5}Br_{1.6}$, $M_{5.4}PS_{3.65}O_{0.75}Br_{1.6}$, $M_{5.7}PS_{4.4}O_{0.3}Br_{1.3}$, $M_{5.1}PS_{4.4}O_{0.3}Br_{1.3}$, and $M_{4.8}PS_{4.1}O_{0.3}Br_{1.6}$, wherein M is as herein defined. For example, the inorganic compound having an argyrodite-type structure can be an inorganic compound having an argyrodite-type structure of formula $M_{5.4}PS_{4.1}O_{0.3}Br_{1.6}$, wherein M is as herein defined.

According to another example of interest, Z is an iodine atom, and the halide of the alkali metal is the iodide of the alkali metal. For example, the inorganic compound having an argyrodite-type structure can be selected from inorganic compounds having an argyrodite-type structure of formulae $M_{5.4}PS_{4.3}O_{0.1}I_{1.6}$, $M_{5.4}PS_{4.1}O_{0.3}I_{1.6}$, $M_{5.4}PS_{3.9}O_{0.5}I_{1.6}$, $M_{5.4}PS_{3.65}O_{0.75}I_{1.6}$, $M_{5.7}PS_{4.4}O_{0.3}I_{1.3}$, $M_{5.1}PS_{4.4}O_{0.3}I_{1.3}$, and $M_{4.8}PS_{4.1}O_{0.3}I_{1.6}$, wherein M is as herein defined.

According to an example of interest, Z is a combination including chlorine and bromine and the halides of the alkali metal are a mixture of the chloride of the alkali metal and the bromide of the alkali metal. For example, the inorganic compound having an argyrodite-type structure can be selected from inorganic compounds having an argyrodite-type structure of the formulae $M_{5.4}PS_{4.1}O_{0.3}Cl_{1.0}Br_{0.6}$, $M_{5.4}PS_{4.1}O_{0.3}Cl_{0.8}Br_{0.8}$, and $M_{5.4}PS_{4.1}O_{0.3}Cl_{0.6}Br_{1.0}$, wherein M is as herein defined.

According to an example of interest, Z is a combination including chlorine, bromine and iodine and the halides of the alkali metal are a mixture of the chloride of the alkali metal, the bromide of the alkali metal and the iodide of the alkali metal. For example, the inorganic compound having an argyrodite-type structure can be selected from inorganic compounds having an argyrodite-type structure of the formula $M_{5.4}PS_{4.1}O_{0.3}Cl_{1.0}Br_{0.5}I_{0.1}$, $M_{5.4}PS_{4.1}O_{0.3}Cl_{0.75}Br_{0.75}I_{0.1}$, $M_{5.4}PS_{4.1}O_{0.3}Cl_{0.7}Br_{0.7}I_{0.2}$, and $M_{5.4}PS_{4.1}O_{0.3}Cl_{1.0}Br_{0.4}I_{0.2}$, wherein M is as herein defined.

According to an example of interest, the alkali metal is lithium and the inorganic compound having an argyrodite-type structure is based on $Li_2S$—$P_2S_5$—$Li_2SO_4$—LiZ (wherein, Z is a halogen atom selected from F, Cl, Br and I, or a combination of at least two thereof), the process comprising a step of direct grinding of the precursors. The precursors consisting of lithium sulfide ($Li_2S$), lithium sulfate ($Li_2SO_4$), phosphorus pentasulfide ($P_2S_5$) and a lithium halide selected from lithium fluoride (LiF), lithium chloride (LiCl), lithium bromide (LiBr), lithium iodide (LiI), and a mixture of at least two thereof.

Non-limiting examples of inorganic compounds having an argyrodite-type structure according to Equation 1 include inorganic compounds having an argyrodite-type structure of formulae $Li_{5.4}PS_{4.3}O_{0.1}Z_{1.6}$, $Li_{5.4}PS_{4.1}O_{0.3}Z_{1.6}$, $Li_{5.4}PS_{3.9}O_{0.5}Z_{1.6}$, $Li_{5.4}PS_{3.65}O_{0.75}Z_{1.6}$, and $Li_{5.7}PS_{4.4}O_{0.3}Z_{1.3}$, wherein Z is as herein defined. Non-limiting examples of inorganic compounds having an argyrodite-type structure according to Equation 2 include inorganic compounds having an argyrodite-type structure of the formulae $Li_{5.1}PS_{4.4}O_{0.3}Z_{1.3}$, and $Li_{4.8}PS_{4.1}O_{0.3}Z_{1.6}$, wherein Z is as herein defined.

According to an example of interest, Z is a chlorine atom, and the lithium halide is LiCl. For example, the inorganic compound having an argyrodite-type structure can be selected from inorganic compounds having an argyrodite-type structure of formulae $Li_{5.4}PS_{4.3}O_{0.1}Cl_{1.6}$, $Li_{5.4}PS_{4.1}O_{0.3}Cl_{1.6}$, $Li_{5.4}PS_{3.9}O_{0.5}Cl_{1.6}$, $Li_{5.4}PS_{3.65}O_{0.75}Cl_{1.6}$, $Li_{5.7}PS_{4.4}O_{0.3}Cl_{1.3}$, $Li_{5.1}PS_{4.4}O_{0.3}Cl_{1.3}$, and $Li_{4.8}PS_{4.1}O_{0.3}Cl_{1.6}$.

According to another example of interest, Z is a bromine atom, and the lithium halide is LiBr. For example, the inorganic compound having an argyrodite-type structure can be selected from inorganic compounds having an argyrodite-type structure of the formulae $Li_{5.4}PS_{4.3}O_{0.1}Br_{1.6}$, $Li_{5.4}PS_{4.1}O_{0.3}Br_{1.6}$, $Li_{5.4}PS_{3.9}O_{0.5}Br_{1.6}$, $Li_{5.4}PS_{3.65}O_{0.75}Br_{1.6}$, $Li_{5.7}PS_{4.4}O_{0.3}Br_{1.3}$, $Li_{5.1}PS_{4.4}O_{0.3}Br_{1.3}$, and $Li_{4.8}PS_{4.1}O_{0.3}Br_{1.6}$. For example, the inorganic compound having an argyrodite-type structure can be an inorganic compound having an argyrodite-type structure of formula $Li_{5.4}PS_{4.1}O_{0.3}Br_{1.6}$.

According to another example of interest, Z is an iodine atom, and the lithium halide is LiI. For example, the inorganic compound having an argyrodite-type structure can be selected from inorganic compounds having an argyrodite-type structure of formulae $Li_{5.4}PS_{4.3}O_{0.1}I_{1.6}$, $Li_{5.4}PS_{4.1}O_{0.3}I_{1.6}$, $Li_{5.4}PS_{3.9}O_{0.5}I_{1.6}$, $Li_{5.4}PS_{3.65}O_{0.75}I_{1.6}$, $Li_{5.7}PS_{4.4}O_{0.3}I_{1.3}$, $Li_{5.1}PS_{4.4}O_{0.3}I_{1.3}$, and $Li_{4.8}PS_{4.1}O_{0.3}I_{1.6}$.

According to an example of interest, Z is a combination including chlorine and bromine and the lithium halides are a mixture of LiCl and LiBr. For example, the inorganic compound having an argyrodite-type structure can be selected from inorganic compounds having an argyrodite-type structure of the formulae $Li_{5.4}PS_{4.1}O_{0.3}Cl_{1.0}Br_{0.6}$, $Li_{5.4}PS_{4.1}O_{0.3}Cl_{0.8}Br_{0.8}$, and $Li_{5.4}PS_{4.1}O_{0.3}Cl_{0.6}Br_{1.0}$.

According to an example of interest, Z is a combination including chlorine, bromine and iodine and the lithium halides are a mixture of LiCl, LiBr and LiI. For example, the inorganic compound having an argyrodite-type structure can be selected from inorganic compounds having an argyrodite-type structure of the formulae $Li_{5.4}PS_{4.1}O_{0.3}Cl_{1.0}Br_{0.5}I_{0.1}$, $Li_{5.4}PS_{4.1}O_{0.3}Cl_{0.75}Br_{0.75}I_{0.1}$, $Li_{5.4}PS_{4.1}O_{0.3}Cl_{0.7}Br_{0.7}I_{0.2}$, and $Li_{5.4}PS_{4.1}O_{0.3}Cl_{1.0}Br_{0.4}I_{0.2}$.

According to another example of interest, the process as herein defined is carried in a single step. That is, preferably, the process does not include an annealing step. Alternatively, the process can include an optional low temperature annealing step. For example, if the process includes an annealing step, the annealing step can be performed at a maximum temperature of about 400° C. or at a maximum temperature of about 300° C.

According to another example, the grinding step can be performed using a mill, for example, a planetary mill. Any known compatible type of mill is contemplated. For example, the grinding step can be performed at a rotational speed, for a specific time and in a milling bead:precursor ratio to obtain an inorganic compound having the desired argyrodite-type structure.

According to another example, the grinding step can be performed at a rotational speed in the range of from about 300 rpm to about 800 rpm, or from about 400 rpm to about 700 rpm, or from about 500 rpm to about 700 rpm. For example, the grinding step can be performed at a rotational speed of about 600 rpm.

According to another example, the grinding step can be performed for a time period in the range of from about 5 hours to about 20 hours. For example, the grinding step can be performed for about 10 hours.

According to another example, the grinding step can be performed in a milling bead:precursor ratio in the range of from about 10 to about 30. For example, the grinding step can be performed in a milling bead:precursor ratio of about 30.

According to some examples, the ratio of grinding beads: precursors is about 30 and the grinding step is performed at a rotational speed in the range of from about 500 rpm to about 700 rpm for about 10 hours to obtain an inorganic compound having the desired argyrodite-type structure. For example, the grinding step is performed at a rotational speed of about 600 rpm.

It is to be understood that the parameters of the grinding step to obtain an inorganic compound with the desired argyrodite-type structure (such as, rotational speed, grinding time, milling bead:precursor ratio, etc.) can be selected and/or optimized depending on the type of mill used.

The use of an alkali metal sulfate (for example, $Li_2SO_4$) as a precursor in the process as defined herein could allow to obtain an argyrodite-type structure without an annealing step or with a low temperature annealing step. In addition, the process as defined herein could allow to obtain inorganic compounds having ionic conductivities substantially similar to the ionic conductivities reported for inorganic compounds obtained by conventional processes from different precursors and comprising an annealing step.

Certain properties of the present inorganic compounds as obtained according to certain embodiments of the present process can also differ from those demonstrated by compounds prepared by conventional methods, for example, by methods using an alkali metal oxide (for example, $Li_2O$) to replace an alkali metal sulfate (for example, $Li_2SO_4$) as a precursor. For example, according to some embodiments, the compounds obtained herein can exhibit greater electrochemical stability, reduced $H_2S$ emission, greater critical current density, or reduced polarization compared to conventionally obtained compounds. The inorganic compounds described herein according to certain embodiments can demonstrate a greater purity of argyrodite structure by $^6Li$ or $^{31}P$ NMR and/or a reduction in the relative intensity of the peaks associated with the $PO_2S_2$, $PO_3S$, and/or $PO_4$ groups in $^{31}P$ NMR. For example, the relative intensity of the $PO_2S_2$, $PO_3S$, and $PO_4$ peaks can be below 1.5, below 0.8 and below 0.3, respectively.

The present technology also relates to an inorganic compound having an argyrodite-type structure as defined herein obtained by the process as defined herein.

The present technology also relates to an electrode material comprising an electrochemically active material and an inorganic compound having an argyrodite-type structure as defined herein or obtained by the process as defined herein.

According to one example, the inorganic compound having an argyrodite-type structure as defined herein can be present as an additive and/or as a coating material in the electrode material. For example, the inorganic compound having an argyrodite-type structure can form a coating layer on the surface of the electrochemically active material.

According to another example, said electrode material is a positive electrode material and the electrochemically active material is selected from a metal oxide, a metal sulfide, a metal oxysulfide, a metal phosphate, a metal fluorophosphate, a metal oxyfluorophosphate, a metal sulfate, a metal halide (for example, a metal fluoride), sulfur, selenium, and a combination of at least two thereof. According to another example, the metal of the electrochemically active material is selected from titanium (Ti), iron (Fe), manganese (Mn), vanadium (V), nickel (Ni), cobalt (Co), aluminum (Al), chromium (Cr), copper (Cu), zirconium (Zr), niobium (Nb), molybdenum (Mo), tungsten (W), and their combinations, when compatible. The electrochemically active material can optionally further comprise an alkali or alkaline earth metal, for example, lithium (Li), sodium (Na), potassium (K) or magnesium (Mg).

Non-limiting examples of electrochemically active materials include lithium metal phosphates, complex oxides, such as $LiM'PO_4$ (where M' is Fe, Ni, Mn, Co, or a combination thereof), $LiV_3O_8$, $V_2O_5$, $LiMn_2O_4$, $LiM''O_2$ (where M'' is Mn, Co, Ni, or a combination thereof), $Li(NiM''')O_2$ (where M''' is Mn, Co, Al, Fe, Cr, Ti, or Zr, or a combination thereof), and their combinations, when compatible.

According to an example of interest, the electrochemically active material is an oxide as described above. For example, the electrochemically active material can be a lithium manganese oxide, wherein the manganese can be partially substituted with a second transition metal, such as a lithium nickel manganese cobalt oxide (NMC). According to one embodiment of interest, the electrochemically active material is $LiNi_{0.6}Mn_{0.2}Co_{0.2}O_2$ (NMC 622).

According to another example, said electrode material is a negative electrode material and the electrochemically active material is selected from a non-alkali and non-alkaline earth metal (for example, indium (In), germanium (Ge) and bismuth (Bi)), an intermetallic compound (for example, SnSb, TiSnSb, $Cu_2Sb$, AlSb, $FeSb_2$, $FeSn_2$, and $CoSn_2$), a metal oxide, a metal nitride, a metal phosphide, a metal phosphate (for example, $LiTi_2(PO_4)_3$), a metal halide (for example, a metal fluoride), a metal sulfide, a metal oxysulfide, a carbon (for example, graphite, graphene, reduced graphene oxide, hard carbon, soft carbon, exfoliated graphite, and amorphous carbon), silicon (Si), a silicon-carbon composite (Si—C), a silicon oxide ($SiO_x$), a silicon oxide-carbon composite ($SiO_x$—C), tin (Sn), a tin-carbon composite (Sn—C), a tin oxide ($SnO_x$), a tin oxide-carbon composite ($SnO_x$—C), and their combinations, when compatible. For example, the metal oxide can be selected from compounds of formulas $M''''_bO_c$ (where M'''' is Ti, Mo, Mn, Ni, Co, Cu, V, Fe, Zn, Nb, or a combination thereof; and b and c are numbers such that the ratio c:b is in the range of from 2 to 3) (for example, $MoO_3$, $MoO_2$, $MoS_2$, $V_2O_5$, and $TiNb_2O_7$), spinel oxides (for example, $NiCo_2O_4$, $ZnCo_2O_4$, $MnCo_2O_4$, $CuCo_2O_4$, and $CoFe_2O_4$), and $LiM'''''O$ (where M''''' is Ti, Mo, Mn, Ni, Co, Cu, V, Fe, Zn, Nb, or a combination thereof) (for example, a lithium titanate (such as $Li_4Ti_5O_{12}$) or a lithium molybdenum oxide (such as $Li_2Mo_4O_{13}$).

According to another example, the electrochemically active material can optionally be doped with other elements included in smaller amounts, for example to modulate or optimize its electrochemical properties. The electrochemically active material can be doped by the partial substitution of the metal with other ions. For example, the electrochemically active material can be doped with a transition metal (for example, Ti, V, Cr, Mn, Fe, Co, Ni, Cu, Zn, Mo, W, or Y) and/or a metal other than a transition metal (for example, Mg, Al, or Sb).

According to another example, the electrochemically active material can be in the form of particles (for example, microparticles and/or nanoparticles) which can be freshly formed or from a commercial source. For example, the electrochemically active material can be in the form of particles coated with a layer of coating material. The coating material can be an electronically conductive material, such as a conductive carbon coating. Alternatively, the coating material can allow to substantially reduce the interfacial reactions at the interface between the electrochemically active material and an electrolyte, for example, a solid electrolyte, and in particular, an inorganic ceramic-type solid electrolyte based on sulfide or oxysulfide (for example, based on the inorganic compound having an argyrodite-type structure as defined herein). For example, the coating material can be selected from $Li_2SiO_3$, $LiTaO_3$, $LiAlO_2$, $Li_2O$—$ZrO_2$, $LiNbO_3$, their combinations, when compatible, and other similar materials. According to one embodiment of interest, the coating material comprises $LiNbO_3$.

According to another example, the electrode material as defined herein further includes an electronically conductive material. Non-limiting examples of electronically conductive materials include a carbon source such as carbon black (for example, Ketjen™ carbon and Super P™ carbon), acetylene black (for example, Shawinigan carbon and Denka™ carbon black), graphite, graphene, carbon fibers (for example, vapor grown carbon fibers (VGCFs)), carbon nanofibers, carbon nanotubes (CNTs), and a combination of at least two thereof. According to one embodiment of interest, the electronically conductive material is a mixture of Li400 carbon black (Denka™) and VGCFs (preferably at a weight ratio in the range of from 65:35 to 85:15).

According to another example, the electrode material as defined herein further includes an additive. For example, the additive is selected from inorganic ionic conductive materials, inorganic materials, glasses, glass-ceramics, ceramics, including nano-ceramics (such as $Al_2O_3$, $TiO_2$, $SiO_2$, and other similar compounds), salts (for example, lithium salts), and a combination of at least two thereof. For example, the additive can be an inorganic ionic conductor selected from LISICON, thio-LISICON, argyrodites, garnets, NASICON, perovskites, oxides, sulfides, phosphides, fluorides, sulfur halides, phosphates, thio-phosphates, of crystalline and/or amorphous form, and a combination of at least two thereof.

According to another example, the electrode material as defined herein further includes a binder. For example, the binder is selected for its compatibility with the various components of an electrochemical cell. Any known compatible binder is contemplated. For example, the binder can be selected from a polymer binder of the polyether, polycarbonate or polyester type, a fluorinated polymer, and a water-soluble binder. According to one example, the binder is a fluorinated polymer such as polyvinylidene fluoride (PVDF) or polytetrafluoroethylene (PTFE). According to another example, the binder is a water-soluble binder such as styrene-butadiene rubber (SBR), acrylonitrile-butadiene rubber (NBR), hydrogenated NBR (HNBR), epichlorohydrin rubber (CHR), or acrylate rubber (ACM), and optionally comprising a thickening agent such as carboxymethyl cellulose (CMC), or a polymer such as poly(acrylic acid) (PAA), poly(methacrylic acid) (PMMA) or a combination thereof. According to another example, the binder is a polymer binder of the polyether type. For example, the polymer binder of the polyether type is linear, branched and/or crosslinked and is based on polyethylene oxide (PEO), poly(propylene oxide) (PPO) or a combination thereof (such as an EO/PO copolymer), and optionally comprises crosslinkable units. For example, the crosslinkable segment of the polymer can be a polymer segment comprising at least one functional group that is crosslinkable multi-dimensionally by irradiation or thermal treatment.

The present technology also relates to an electrode comprising an electrode material as defined herein. According to one example, the electrode can be on a current collector (for example, an aluminum or a copper foil). Alternatively, the electrode can be self-supported.

The present technology also relates to an electrolyte comprising an inorganic compound having an argyrodite-type structure as defined herein or obtained by the process as defined herein.

According to one example, the electrolyte can be selected for its compatibility with the various elements of an electrochemical cell. Any compatible type of electrolyte is contemplated. According to one example, the electrolyte is a liquid electrolyte comprising a salt in a solvent. According to an alternative, the electrolyte is a gel electrolyte comprising a salt in a solvent and optionally a solvating polymer. According to another alternative, the electrolyte is a solid polymer electrolyte comprising a salt in a solvating polymer. According to another alternative, the electrolyte comprises an inorganic solid electrolyte material, for example, the electrolyte can be a ceramic-type inorganic solid electrolyte. According to another alternative, the electrolyte is a polymer-ceramic hybrid solid electrolyte.

According to another example, the salt, if present in the electrolyte, can be an ionic salt, such as a lithium salt. Non-limiting examples of lithium salts include lithium hexafluorophosphate ($LiPF_6$), lithium bis(trifluoromethanesulfonyl)imide (LiTFSI), lithium bis(fluorosulfonyl)imide (LiFSI), lithium 2-trifluoromethyl-4,5-dicyanoimidazolate (LiTDI), lithium 4,5-dicyano-1,2,3-triazolate (LiDCTA), lithium bis(pentafluoroethylsulfonyl)imide (LiBETI), lithium tetrafluoroborate ($LiBF_4$), lithium bis(oxalato)borate (LiBOB), lithium nitrate ($LiNO_3$), lithium chloride (LiCl), lithium bromide (LiBr), lithium fluoride (LiF), lithium perchlorate ($LiClO_4$), lithium hexafluoroarsenate ($LiAsF_6$), lithium trifluoromethanesulfonate ($LiSO_3CF_3$) (LiTf), lithium fluoroalkylphosphate $Li[PF_3(CF_2CF_3)_3]$ (LiFAP), lithium tetrakis(trifluoroacetoxy)borate $Li[B(OCOCF_3)_4]$ (LiTFAB), lithium bis(1,2-benzenediolato(2-)-O,O')borate $Li[B(C_6O_2)_2]$ (LiBBB), and a combination of at least two thereof.

According to another example, the solvent, if present in the electrolyte, can be a non-aqueous solvent. Non-limiting examples of solvents include cyclic carbonates, such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); lactones such as γ-butyrolactone (γ-BL) and γ-valerolactone (γ-VL); acyclic ethers such as 1,2-dimethoxyethane (DME), 1,2-diethoxyethane (DEE), ethoxymethoxyethane (EME), trimethoxymethane, and ethylmonoglyme; cyclic ethers such as tetrahydrofuran, 2-methyltetrahydrofuran, 1,3-dioxolane and dioxolane derivatives; and other solvents such as dimethylsulfoxide, formamide, acetamide, dimethylformamide, acetonitrile, propylnitrile, nitromethane, phosphoric acid triester, sulfolane, methylsulfolane, propylene carbonate derivatives and mixtures thereof.

According to another example, the electrolyte is a gel electrolyte or a gel polymer electrolyte. The gel polymer electrolyte can comprise, for example, a polymer precursor and a salt (for example, a salt as previously defined), a solvent (for example, a solvent as previously defined), and a polymerization and/or crosslinking initiator, if necessary. Examples of gel electrolyte include, without limitation, gel electrolytes such as those described in PCT patent applications published under numbers WO2009/111860 (Zaghib et al.) and WO2004/068610 (Zaghib et al.).

According to another example, a gel electrolyte or liquid electrolyte as defined above can also impregnate a separator such as a polymer separator. Examples of separators include, but are not limited to, polyethylene (PE), polypropylene (PP), cellulose, polytetrafluoroethylene (PTFE), polyvinylidene fluoride (PVDF) and polypropylene-polyethylene-polypropylene (PP/PE/PP) separators. For example, the separator is a commercial polymer separator of the Celgard™ type.

According to another example, the electrolyte is a solid polymer electrolyte. For example, the solid polymer electrolyte can be selected from any known solid polymer electrolyte and can be selected for its compatibility with the various elements of an electrochemical cell. Solid polymer electrolytes generally include a salt as well as one or more solid polar polymer(s), optionally crosslinked. Polyether-type polymers, such as those based on polyethylene oxide (POE), can be used, but several other compatible polymers are also known for the preparation of solid polymer electrolytes and are also contemplated. The polymer can be crosslinked. Examples of such polymers include branched polymers, for example, star-shaped polymers or comb-shaped polymers such as those described in PCT patent application published under number WO2003/063287 (Zaghib et al.).

According to another example, the solid polymer electrolyte can include a block copolymer composed of at least one lithium-ion solvating segment and optionally at least one crosslinkable segment. Preferably, the lithium-ion solvating segment is selected from homo- or copolymers having repeating units of Formula I:

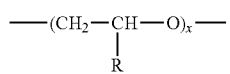

Formula I wherein,
R is selected from a hydrogen atom, and a $C_1$-$C_{10}$alkyl or —($CH_2$—O—$R^aR^b$) group;
$R^a$ is ($CH_2$—$CH_2$—O)$_y$;
$R^b$ is selected from a hydrogen atom and a $C_1$-$C_{10}$alkyl group;
x is an integer selected from the range of 10 to 200,000; and
y is an integer selected from the range of 0 to 10.

According to another example, the crosslinkable segment of the copolymer is a polymer segment comprising at least one functional group that is multi-dimensionally crosslinkable by irradiation or thermal treatment.

When the electrolyte is a liquid electrolyte, a gel electrolyte, or a solid polymer electrolyte, the inorganic compound having an argyrodite-type structure as defined herein can be present as an additive in the electrolyte.

When the electrolyte is a polymer-ceramic hybrid solid electrolyte or a ceramic-type inorganic solid electrolyte, the inorganic compound having an argyrodite type structure as herein defined can be present as the inorganic solid electrolyte (ceramic) material.

According to another example, the electrolyte can also optionally include additional components such as ionic conductive materials, inorganic particles, glass or ceramic particles and other additives of the same type. The additional component can be selected for its compatibility with the various elements of an electrochemical cell. According to one example, the additional component can be substantially dispersed in the electrolyte. Alternatively, the additional component can be in a separate layer.

The present technology also relates to an electrochemical cell comprising a negative electrode, a positive electrode and an electrolyte, wherein at least one of the positive electrode or the negative electrode is as defined herein or comprises an electrode material as defined herein.

According to one example, the negative electrode is as defined herein or comprises an electrode material as defined herein. For example, the electrochemically active material of the negative electrode can be selected for its electrochemical compatibility with the various elements of the electrochemical cell as herein defined. For example, the electrochemically active material of the negative electrode material can possess a substantially lower oxidation-reduction potential than the electrochemically active material of the positive electrode.

According to another example, the positive electrode is as defined herein or includes an electrode material as defined herein and the negative electrode includes an electrochemically active material selected from any known compatible electrochemically active materials. For example, the electrochemically active material of the negative electrode can be selected for its electrochemical compatibility with the various elements of the electrochemical cell as herein defined. Non-limiting examples of electrochemically active materials of the negative electrode include alkali metals, alkaline earth metals, alloys comprising at least one alkali or alkaline earth metal, non-alkali and non-alkaline earth metals (for example, indium (In), germanium (Ge), and bismuth (Bi)), and intermetallic alloys or compounds (for example, SnSb, TiSnSb, $Cu_2Sb$, AlSb, $FeSb_2$, $FeSn_2$, and $CoSn_2$). For example, the electrochemically active material of the negative electrode can be in the form of a film. According to one embodiment of interest, the electrochemically active material of the negative electrode can comprise a film of metallic lithium or of an alloy including or based on metallic lithium.

According to another example, the positive electrode can be pre-lithiated and the negative electrode can be initially (i.e., before cycling the electrochemical cell) substantially or completely free of lithium. The negative electrode can be lithiated in situ during the cycling of said electrochemical cell, particularly during the first charge. According to one example, metallic lithium can be deposited in situ on the current collector (for example, a copper current collector) during the cycling of the electrochemical cell, particularly during the first charge. According to another example, an alloy including metallic lithium can be generated on the surface of a current collector (for example, an aluminum current collector) during the cycling of the electrochemical cell, particularly during the first charge. It is understood that the negative electrode can be generated in situ during the cycling of the electrochemical cell, particularly during the first charge.

According to another example, the positive electrode and the negative electrode are both as defined herein, or both comprise an electrode material as defined herein.

The present technology also relates to an electrochemical cell comprising a negative electrode, a positive electrode, and an electrolyte, wherein the electrolyte is as defined herein.

The present technology also relates to an electrochemical cell comprising a negative electrode, a positive electrode and an electrolyte, wherein the electrolyte is as defined herein and at least one of the positive electrode or the negative electrode is as defined herein or comprises an electrode material as defined herein.

According to one example, the positive electrode is as defined herein or comprises an electrode material as defined herein.

The present technology also relates to a battery comprising at least one electrochemical cell as defined herein. For example, the battery can be a primary battery or a secondary battery. According to one example, the battery is selected from the group consisting of a lithium battery, a lithium-ion battery, a sodium battery, a sodium-ion battery, a magnesium battery, a magnesium-ion battery, a potassium battery, and a potassium-ion battery. According to a variant of interest, the battery is an all-solid-state battery.

According to one example, the use of an alkali metal sulfate (for example, $Li_2SO_4$) as a precursor in the process as defined herein can allow to reduce the production costs through a lower amount of $Li_2S$ used and/or the absence of an annealing step or the reduction of the annealing temperature.

According to another example, the process as defined herein can allow to obtain inorganic compounds having ionic conductivities substantially similar to the ionic conductivities reported for inorganic compounds obtained by conventional processes from different precursors and comprising an annealing step.

According to another example, the process as defined herein can allow to obtain inorganic compounds having improved electrochemical stability.

According to another example, the process as defined herein can allow to obtain an inorganic compound having improved safety, for example, by substantially reducing the amount of $H_2S$ generated by the exposure of the inorganic compound to humidity or ambient air.

According to another example, the process as defined herein can allow to obtain a greater critical current density and thus a better stability in contact with the metallic or metallic alloy negative electrode.

EXAMPLES

The following examples are for illustrative purposes and should not be construed as further limiting the scope of the invention as contemplated. These examples will be better understood by referring to the accompanying figures.

Unless otherwise indicated, all numbers expressing quantities of components, preparation conditions, concentrations, properties, and so forth used herein are to be understood as modified in all instances by the term "about." At the very least, each numerical parameter should be construed in light of the number of reported significant digits and by applying ordinary rounding techniques. Accordingly, unless indicated to the contrary, the numerical parameters set forth herein are approximations that can vary depending upon the properties sought to be obtained. Notwithstanding that the numerical ranges and parameters setting forth the broad scope of embodiments are approximations, the numerical values set forth in the following examples are reported as precisely as possible. Any numerical value, however, inherently contains certain errors resulting from variations in experiments, testing measurements, statistical analyses, etc.

Example 1—Synthesis of the Argyrodites

Inorganic compounds having an argyrodite-type structure of formulae $Li_{5.4}PS_{4.3}O_{0.1}Cl_{1.6}$, $Li_{5.4}PS_{4.1}O_{0.3}Cl_{1.6}$, $Li_{5.4}PS_{3.9}O_{0.5}Cl_{1.6}$, $Li_{5.4}PS_{3.65}O_{0.75}Cl_{1.6}$, $Li_{5.7}PS_{4.4}O_{0.3}Cl_{1.3}$, $Li_{5.1}PS_{4.4}O_{0.3}Cl_{1.3}$, $Li_{4.8}PS_{4.1}O_{0.3}Cl_{1.6}$, $Li_{5.4}PS_{4.4}Cl_{1.6}$, $Li_{5.4}PS_{4.1}O_{0.3}Cl_{1.6}$, $Li_{5.4}PS_{3.9}O_{0.5}Cl_{1.6}$, $Li_{5.4}PS_{4.1}O_{0.3}Br_{1.6}$, $Li_{5.4}PS_{4.1}O_{0.3}Cl_{1.0}Br_{0.6}$, $Li_{5.4}PS_{4.1}O_{0.3}Cl_{0.8}Br_{0.8}$, $Li_{5.4}PS_{4.1}O_{0.3}Cl_{0.6}Br_{1.0}$, $Li_{5.4}PS_{4.1}O_{0.3}Cl_{1.0}Br_{0.5}I_{0.1}$, $Li_{5.4}PS_{4.1}O_{0.3}Cl_{0.75}Br_{0.75}I_{0.1}$, $Li_{5.4}PS_{4.1}O_{0.3}Cl_{0.7}Br_{0.7}I_{0.2}$, $Li_{5.4}PS_{4.1}O_{0.3}Cl_{1.0}Br_{0.4}I_{0.2}$, and $Li_6PS_5Cl$ were fully prepared in a glovebox under an inert atmosphere ($H_2O<0.1$ ppm; $O_2<0.1$ ppm) by a solid-state reaction process without thermal treatment. The inorganic compounds were obtained by a grinding process from the precursors $Li_2S$, $P_2S_5$, $Li_2SO_4$ or $Li_2O$ and at least one Li halide (LiCl, LiBr and/or LiI) in order to obtain powders having the desired stoichiometries according to the following reaction equations:

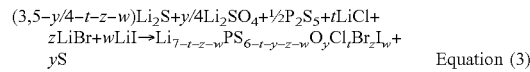

$(3,5-y/4-t-z-w)Li_2S+y/4Li_2SO_4+\frac{1}{2}P_2S_5+tLiCl+zLiBr+wLiI \rightarrow Li_{7-t-z-w}PS_{6-t-y-z-w}O_yCl_tBr_zI_w+yS$     Equation (3)

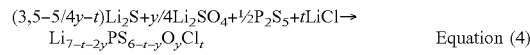

$(3,5-5/4y-t)Li_2S+y/4Li_2SO_4+\frac{1}{2}P_2S_5+tLiCl \rightarrow Li_{7-t-2y}PS_{6-t-y}O_yCl_t$     Equation (4)

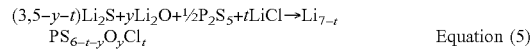

$(3,5-y-t)Li_2S+yLi_2O+\frac{1}{2}P_2S_5+tLiCl \rightarrow Li_{7-t}PS_{6-t-y}O_yCl_t$     Equation (5)

The grinding of the powders was carried out by two different processes.

First Process for Grinding Powders (Process 1):

The grinding of the powders was carried out using a PULVERISETTE 7 planetary mill. 1.7 g of powder as well as 15 yttriated zirconia milling beads having a diameter of 10 mm (bead:powder=30 mass ratio) were placed in a 45 mL yttriated zirconia grinding jar. The powders were ground at a speed of about 600 rpm for about 10 hours to produce the inorganic compounds having an argyrodite-type structure.

Second Process for Grinding Powders (Process 2):

Grinding of the powders was carried out using a PM100 planetary mill. 14 g of powder as well as 16 yttriated zirconia milling beads having a diameter of 20 mm (bead:powder=30 mass ratio) were placed in a 250 mL yttriated zirconia grinding jar. The powders were ground at a speed of about 650 rpm for about 10 hours to produce the inorganic compounds having an argyrodite-type structure.

Argyrodite of Formula $Li_{5.4}PS_{4.3}O_{0.1}Cl_{1.6}$ (Argyrodite 1):

An inorganic compound having an argyrodite-type structure of formula $Li_{5.4}PS_{4.3}O_{0.1}Cl_{1.6}$ was obtained by the Process 1 of the present example from the precursors $Li_2S$, $P_2S_5$, LiCl, and $Li_2SO_4$ according to Equation 3 wherein, t=1.6; z=0; w=0; and y=0.1.

Argyrodite of Formula $Li_{5.4}PS_{4.1}O_{0.3}Cl_{1.6}$ (Argyrodite 2):

An inorganic compound having an argyrodite-type structure of formula $Li_{5.4}PS_{4.1}O_{0.3}Cl_{1.6}$ was obtained by the Process 1 of the present example from the precursors $Li_2S$, $P_2S_5$, LiCl, and $Li_2SO_4$ according to Equation 3 wherein, t=1.6; z=0; w=0; and y=0.3.

Argyrodite of Formula $Li_{5.4}PS_{3.9}O_{0.5}Cl_{1.6}$ (Argyrodite 3):

An inorganic compound having an argyrodite-type structure of formula $Li_{5.4}PS_{3.9}O_{0.5}Cl_{1.6}$ was obtained by the Process 1 of the present example from the precursors $Li_2S$, $P_2S_5$, LiCl, and $Li_2SO_4$ according to Equation 3 wherein, t=1.6; z=0; w=0; and y=0.5.

Argyrodite of Formula $Li_{5.4}PS_{3.65}O_{0.75}Cl_{1.6}$ (Argyrodite 4):

An inorganic compound having an argyrodite-type structure of formula $Li_{5.4}PS_{3.65}O_{0.75}Cl_{1.6}$ was obtained by the Process 1 of the present example from the precursors $Li_2S$, $P_2S_5$, LiCl, and $Li_2SO_4$ according to Equation 3 wherein, t=1.6; z=0; w=0; and y=0.75.

Argyrodite of Formula $Li_{5.7}PS_{4.4}O_{0.3}Cl_{1.3}$ (Argyrodite 5):

An inorganic compound having an argyrodite-type structure of formula $Li_{5.7}PS_{4.4}O_{0.3}Cl_{1.3}$ was obtained by the Process 1 of the present example from the precursors $Li_2S$, $P_2S_5$, LiCl, and $Li_2SO_4$ according to Equation 3 wherein, t=1.3; z=0; w=0; and y=0.3.

Argyrodite of Formula $Li_{5.1}PS_{4.4}O_{0.3}Cl_{1.3}$ (Argyrodite 6):

An inorganic compound having an argyrodite-type structure of formula $Li_{5.1}PS_{4.4}O_{0.3}Cl_{1.3}$ was obtained by the Process 1 of the present example from the precursors $Li_2S$, $P_2S_5$, LiCl, and $Li_2SO_4$ according to Equation 4 wherein, t=1.3; z=0; w=0; and y=0.3.

Argyrodite of Formula $Li_{4.8}PS_{4.1}O_{0.3}Cl_{1.6}$ (Argyrodite 7):

An inorganic compound having an argyrodite-type structure of formula $Li_{4.8}PS_{4.1}O_{0.3}Cl_{1.6}$ was obtained by the Process 1 of the present example from the precursors $Li_2S$, $P_2S_5$, LiCl, and $Li_2SO_4$ according to Equation 4 wherein, t=1.6; z=0; w=0; and y=0.3.

Argyrodite of Formula $Li_{5.4}PS_{4.4}Cl_{1.6}$ (Argyrodite 8) (Comparative Example):

An inorganic compound having an argyrodite-type structure of formula $Li_{5.4}PS_{4.4}Cl_{1.6}$ was obtained for comparative purposes by the Process 1 of the present example from the precursors $Li_2S$, $P_2S_5$, and LiCl according to Equation 3 wherein, t=1.6; z=0; w=0; and y=0.

Argyrodite of Formula $Li_{5.4}PS_{4.1}O_{0.3}Cl_{1.6}$ (Argyrodite 9) (Comparative Example):

An inorganic compound having an argyrodite-type structure of formula $Li_{5.4}PS_{4.1}O_{0.3}Cl_{1.6}$ was obtained for comparative purposes by the Process 1 of the present example from the precursors $Li_2S$, $P_2S_5$, LiCl, and $Li_2O$ according to Equation 5 wherein, t=1.6; z=0; w=0; and y=0.3.

Argyrodite of Formula $Li_{5.4}PS_{3.9}O_{0.5}Cl_{1.6}$ (Argyrodite 10) (Comparative Example):

An inorganic compound having an argyrodite-type structure of formula $Li_{5.4}PS_{3.9}O_{0.5}Cl_{1.6}$ was obtained for comparative purposes by the Process 1 of the present example from the precursors $Li_2S$, $P_2S_5$, LiCl, and $Li_2O$ according to Equation 5 wherein, t=1.6; z=0; w=0; and y=0.5.

Argyrodite of Formula $Li_6PS_5Cl$ (Argyrodite 11) (Comparative Example):

An inorganic compound having an argyrodite-type structure of formula $Li_6PS_5Cl$ was obtained for comparative purposes by the Process 1 of the present example from the precursors $Li_2S$, $P_2S_5$, and LiCl according to Equation 3 wherein, t=1.0; z=0; w=0; and y=0.

Argyrodite of Formula $Li_{5.4}PS_{4.1}O_{0.3}Cl_{1.0}Br_{0.6}$ (Argyrodite 12):

An inorganic compound having an argyrodite-type structure of formula $Li_{5.4}PS_{4.1}O_{0.3}Cl_{1.0}Br_{0.6}$ was obtained by the Process 1 of the present example from the precursors $Li_2S$, $P_2S_5$, LiCl, LiBr, and $Li_2SO_4$ according to Equation 3 wherein, t=1.0; z=0.6; w=0; and y=0.3.

Argyrodite of Formula $Li_{5.4}PS_{4.1}O_{0.3}Cl_{0.8}Br_{0.8}$ (Argyrodite 13):

An inorganic compound having an argyrodite-type structure of formula $Li_{5.4}PS_{4.1}O_{0.3}Cl_{0.8}Br_{0.8}$ was obtained by the Process 1 of the present example from the precursors $Li_2S$, $P_2S_5$, LiCl, LiBr, and $Li_2SO_4$ according to Equation 3 wherein, t=0.8; z=0.8; w=0; and y=0.3.

Argyrodite of Formula $Li_{5.4}PS_{4.1}O_{0.3}Cl_{0.6}Br_{1.0}$ (Argyrodite 14):

An inorganic compound having an argyrodite-type structure of formula $Li_{5.4}PS_{4.1}O_{0.3}Cl_{0.6}Br_{1.0}$ was obtained by the Process 1 of the present example from the precursors $Li_2S$, $P_2S_5$, LiCl, LiBr, and $Li_2SO_4$ according to Equation 3 wherein, t=0.6; z=1; w=0; and y=0.3.

Argyrodite of Formula $Li_{5.4}PS_{4.1}O_{0.3}Br_{1.6}$ (Argyrodite 15):

An inorganic compound having an argyrodite-type structure of formula $Li_{5.4}PS_{4.1}O_{0.3}Br_{1.6}$ was obtained by the Process 1 of the present example from the precursors $Li_2S$, $P_2S_5$, LiBr, and $Li_2SO_4$ according to Equation 3 wherein, t=0; w=0; z=1.6; and y=0.3.

Argyrodite of Formula $Li_{5.4}PS_{4.1}O_{0.3}Cl_{1.0}Br_{0.5}I_{0.1}$ (Argyrodite 16):

An inorganic compound having an argyrodite-type structure of formula $Li_{5.4}PS_{4.1}O_{0.3}Cl_{1.0}Br_{0.5}I_{0.1}$ was obtained by the Process 1 of the present example from the precursors $Li_2S$, $P_2S_5$, LiCl, LiBr, LiI, and $Li_2SO_4$ according to Equation 3 wherein, t=1.0; z=0.5; w=0.1; and y=0.3.

Argyrodite of Formula $Li_{5.4}PS_{4.1}O_{0.3}Cl_{0.75}Br_{0.75}I_{0.1}$ (Argyrodite 17):

An inorganic compound having an argyrodite-type structure of formula $Li_{5.4}PS_{4.1}O_{0.3}Cl_{0.75}Br_{0.75}I_{0.1}$ was obtained by the Process 1 of the present example from the precursors $Li_2S$, $P_2S_5$, LiCl, LiBr, LiI, and $Li_2SO_4$ according to Equation 3 wherein, t=0.75; z=0.75; w=0.1; and y=0.3.

Argyrodite of Formula $Li_{5.4}PS_{4.1}O_{0.3}Cl_{1.0}Br_{0.4}I_{0.2}$ (Argyrodite 18):

An inorganic compound having an argyrodite-type structure of formula $Li_{5.4}PS_{4.1}O_{0.3}Cl_{0.7}Br_{0.7}I_{0.2}$ was obtained by the Process 1 of the present example from the precursors $Li_2S$, $P_2S_5$, LiCl, LiBr, LiI, and $Li_2SO_4$ according to Equation 3 wherein, t=0.7; z=0.7; w=0.2; and y=0.3.

Argyrodite of Formula $Li_{5.4}PS_{4.1}O_{0.3}Cl_{1.0}Br_{0.4}I_{0.2}$ (Argyrodite 19):

An inorganic compound having an argyrodite-type structure of formula $Li_{5.4}PS_{4.1}O_{0.3}Cl_{1.0}Br_{0.4}I_{0.2}$ was obtained by the Process 1 of the present example from the precursors $Li_2S$, $P_2S_5$, LiCl, LiBr, LiI, and $Li_2SO_4$ according to Equation 3 wherein, t=1.0; z=0.4; w=0.2; and y=0.3.

Argyrodite of Formula $Li_{5.4}PS_{4.1}O_{0.3}Cl_{1.6}$ (Argyrodite 20):

An inorganic compound having an argyrodite-type structure of formula $Li_{5.4}PS_{4.1}O_{0.3}Cl_{1.6}$ was obtained by the Process 2 of the present example from the precursors $Li_2S$, $P_2S_5$, LiCl, and $Li_2SO_4$ according to Equation 3 wherein, t=1.6; z=0; w=0; and y=0.3.

Argyrodite of Formula $Li_{5.4}PS_{4.1}O_{0.3}Cl_{0.8}Br_{0.8}$ (Argyrodite 21):

An inorganic compound having an argyrodite-type structure of formula $Li_{5.4}PS_{4.1}O_{0.3}Cl_{0.8}Br_{0.8}$ was obtained by the Process 2 of the present example from the precursors $Li_2S$, $P_2S_5$, LiCl, LiBr, and $Li_2SO_4$ according to Equation 3 wherein, t=0.8; z=0.8; w=0; and y=0.3.

Example 2—X-Ray Diffraction (XRD) Characterization of Inorganic Compounds Having an Argyrodite-Type Structure The crystal structure of the argyrodites prepared in Example 1 was studied by XRD. The analysis was carried out entirely in an anhydrous chamber and the X-ray spectra were obtained using a Rigaku MiniFlex™ X-ray diffractometer equipped with a cobalt X-ray source.

Pellets were prepared by compressing 80 mg of argyrodite powder prepared in Example 1. The pellets were then placed in sealed sample holders which were closed in a glove box under an inert atmosphere.

In the X-ray diffraction patterns presented in FIGS. 1 to 6, the peaks corresponding to the $Li_3PO_4$, $Li_2S$, and LiCl impurities were identified by solid lines, dashed lines, and dash-dot-dot lines, respectively. The "D" peak comes from the dome used in the XRD analysis. The other peaks correspond to the argyrodite-type structure.

FIG. 1 presents the X-ray diffraction patterns obtained for the argyrodites (Argyrodites 1 to 4 and 8). The X-ray diffraction patterns presented in FIG. 1 show that the argyrodite-type structure is indeed obtained for all the compositions. It is possible to observe the presence of a substantially higher amount of impurities (LiCl, $Li_2S$ and $Li_3PO_4$) for the most oxygen rich compositions (y>0.3) (Argyrodites 3 and 4).

Figure 2:
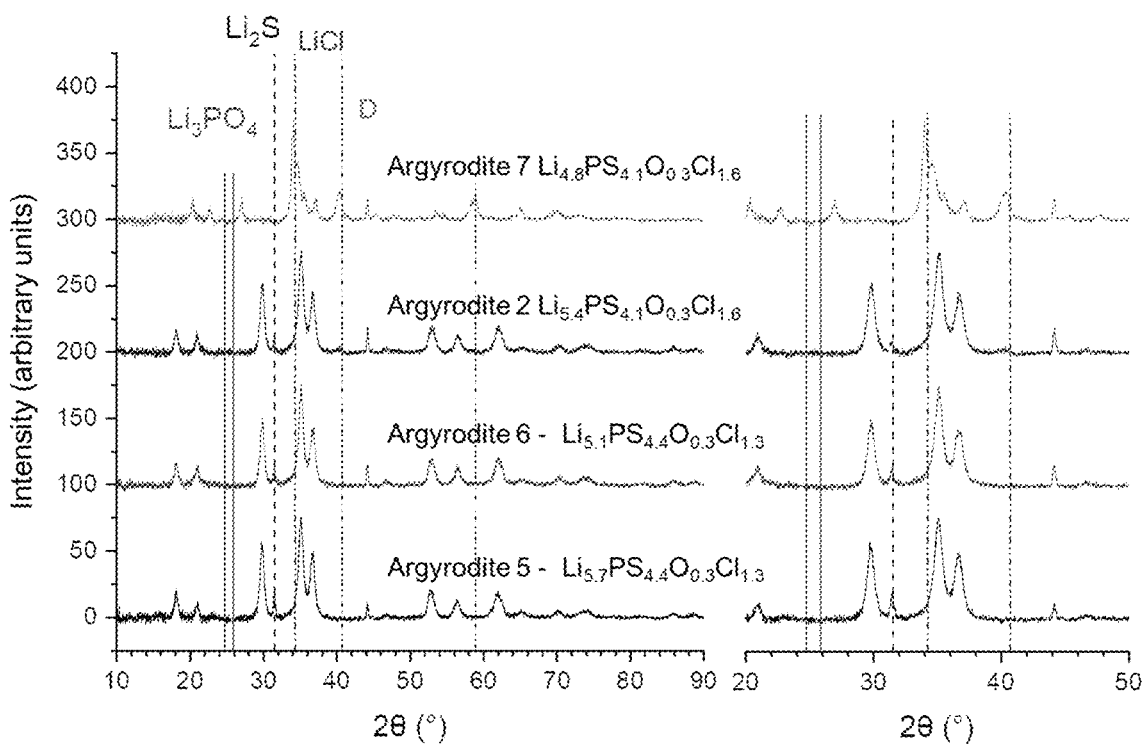
FIG. 2 presents X-ray diffraction patterns obtained for the powders of Argyrodites 2 and 5 to 7, as described in Example 2.

FIG. 2 presents the X-ray diffraction patterns obtained for the Argyrodites 2 and 5 to 7. FIG. 2 shows that the argyrodite structure was indeed obtained for t=1.3 and y=0.3 (Argyrodites 5 and 6), and this, for the two syntheses (Equations 3 and 4). It is possible to observe in FIG. 2, the presence of less residual $Li_2S$ for the structure of Argyrodite 6 than for the structure of Argyrodite 5. FIG. 2 also shows a degradation of the structure for the argyrodite of formula $Li_{4.8}PS_{4.1}O_{0.3}Cl_{1.6}$ wherein, t=1.6 and y=0.3 (Argyrodite 7). It is possible to observe a substantially larger amount of residual LiCl, but no trace of $Li_2S$. This indicates that an argyrodite-type structure including less lithium could induce a mixture of argyrodite-type and parasitic phases (e.g., LiCl).

Figure 3:
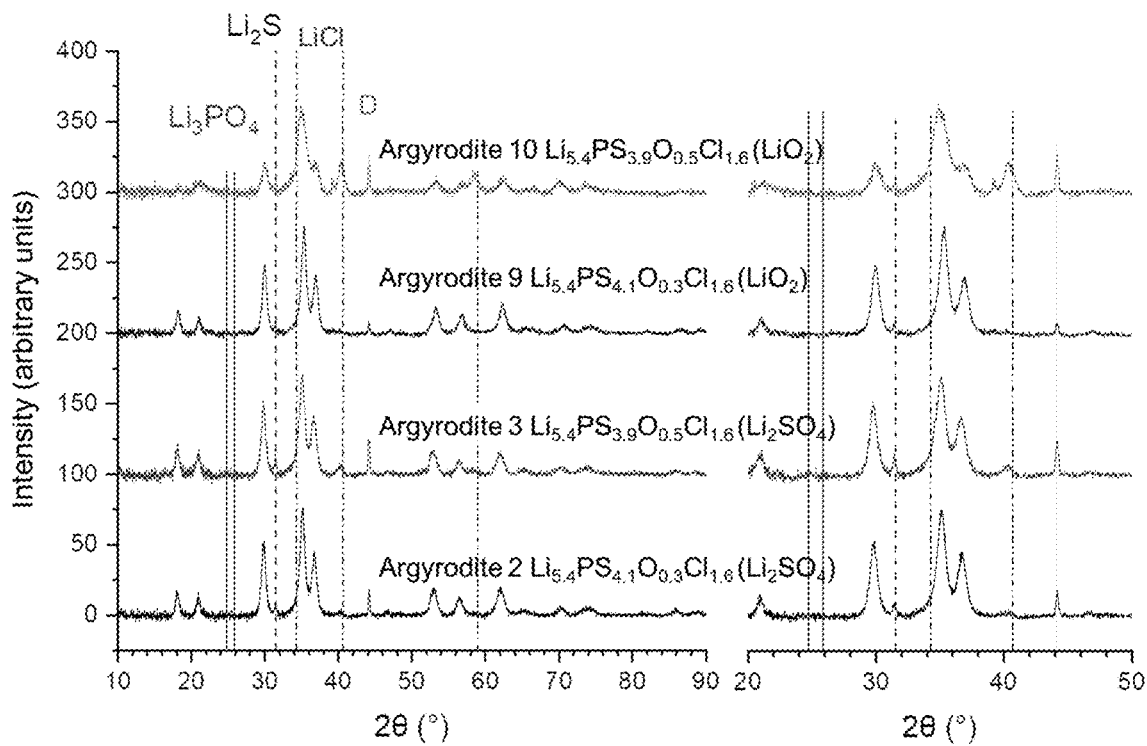
FIG. 3 presents X-ray diffraction patterns obtained for the powders of Argyrodites 2, 3, 9 and 10, as described in Example 2.

FIG. 3 presents the X-ray diffraction patterns for argyrodites obtained from $Li_2SO_4$ (Argyrodites 2 and 3) and $Li_2O$ (Argyrodites 9 and 10) precursors. FIG. 3 shows that for an oxygen content of 0.3 (Argyrodites 2 and 9) there is no significant difference observable on the structure of the argyrodite of the inorganic compounds obtained from the two different precursors. However, for an oxygen content of 0.5, the argyrodite prepared from $Li_2O$ (Argyrodite 10) contains substantially more impurities (notably LiCl) and has a substantially less well-defined structure compared to the argyrodite prepared from $Li_2SO_4$ (Argyrodite 3). Thus, it is possible to obtain substantially purer oxidized argyrodite over a wide composition range from the $Li_2SO_4$ precursor compared to the commonly used $Li_2O$ precursor.

Figure 4:
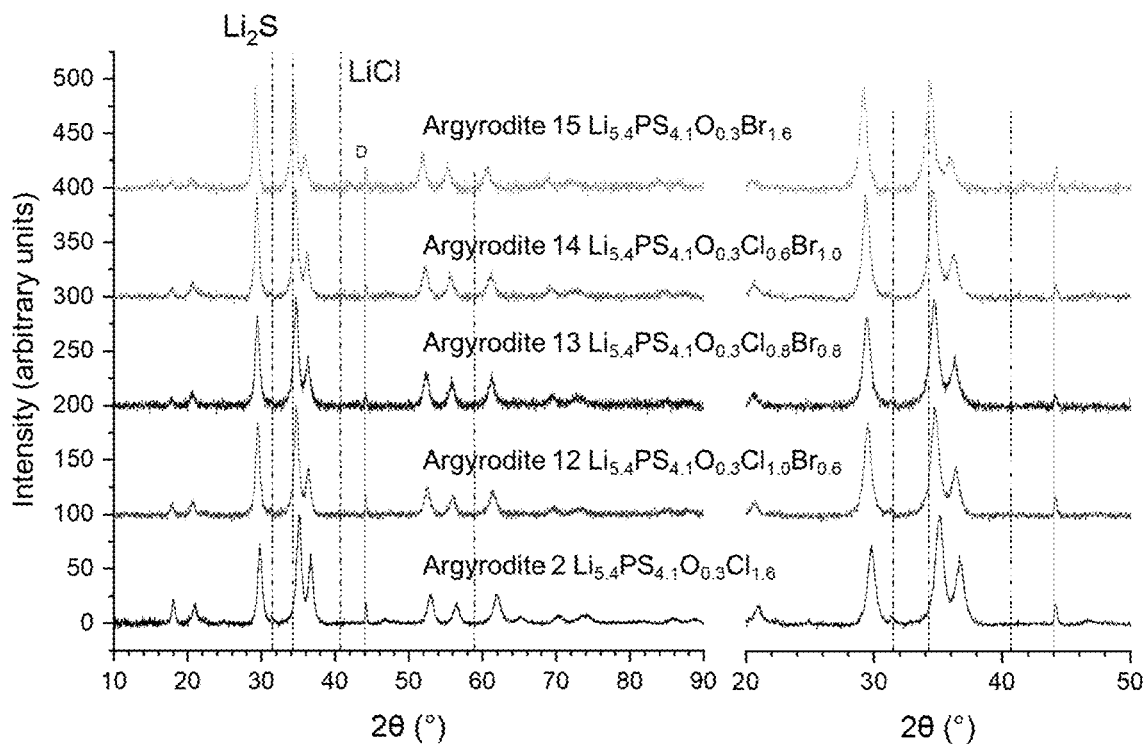
FIG. 4 presents X-ray diffraction patterns obtained for the powders of Argyrodites 2 and 12 to 15, as described in Example 2.

FIG. 4 presents the X-ray diffraction patterns for argyrodites obtained from the $Li_2SO_4$ precursor and a mixture of halides including LiCl and LiBr (Argyrodites 12 to 14) compared to those of the same compositions obtained from LiCl (Argyrodite 2) or LiBr (Argyrodite 15). FIG. 4 shows that the argyrodite structure is well preserved regardless of the Br and Cl content. The position of the peaks decreases as the Br content increases. This can be attributed to the increase of the lattice parameter, a phenomenon known in the literature.

Figure 5:
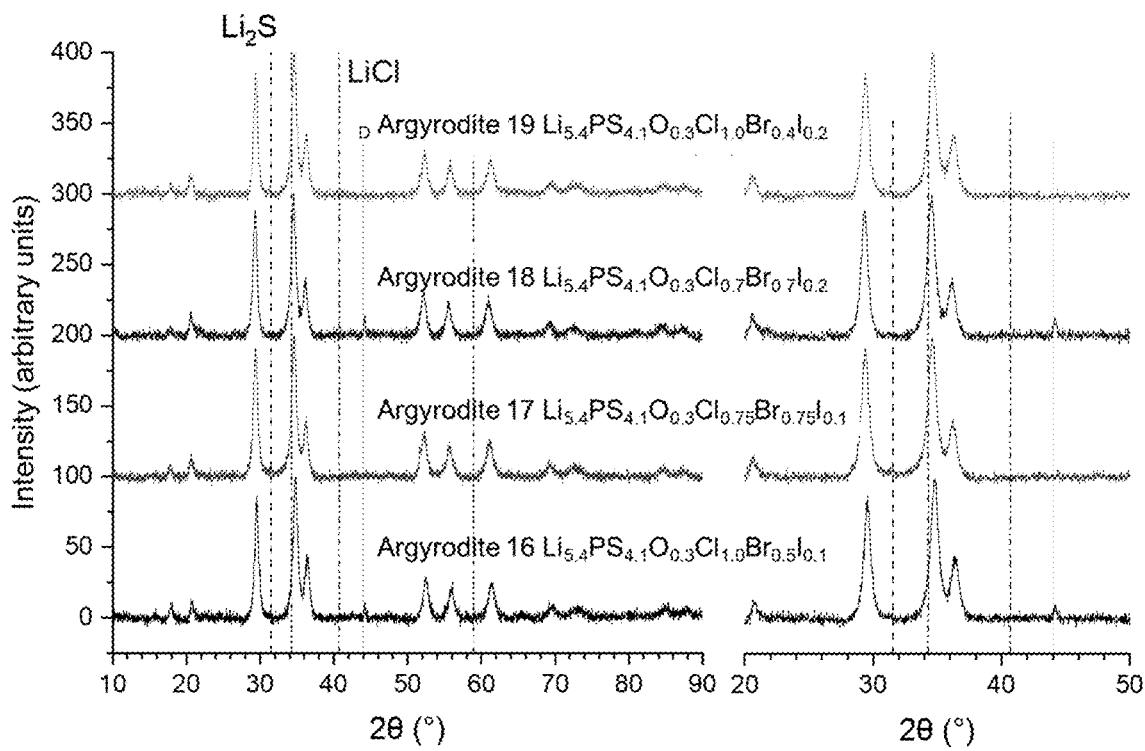
FIG. 5 presents X-ray diffraction patterns obtained for the powders of Argyrodites 16 to 19, as described in Example 2.

FIG. 5 presents the X-ray diffraction patterns for argyrodites obtained from the $Li_2SO_4$ precursor and a mixture of halides including LiCl, LiBr, and LiI (Argyrodites 16 to 19). FIG. 5 shows that the argyrodite structure is well preserved, even with the mixture of the three halides.

It is thus possible to obtain a compound having an oxidized argyrodite structure regardless of the composition and the halide mixture with oxidation from the $Li_2SO_4$ precursor.

Figure 6:
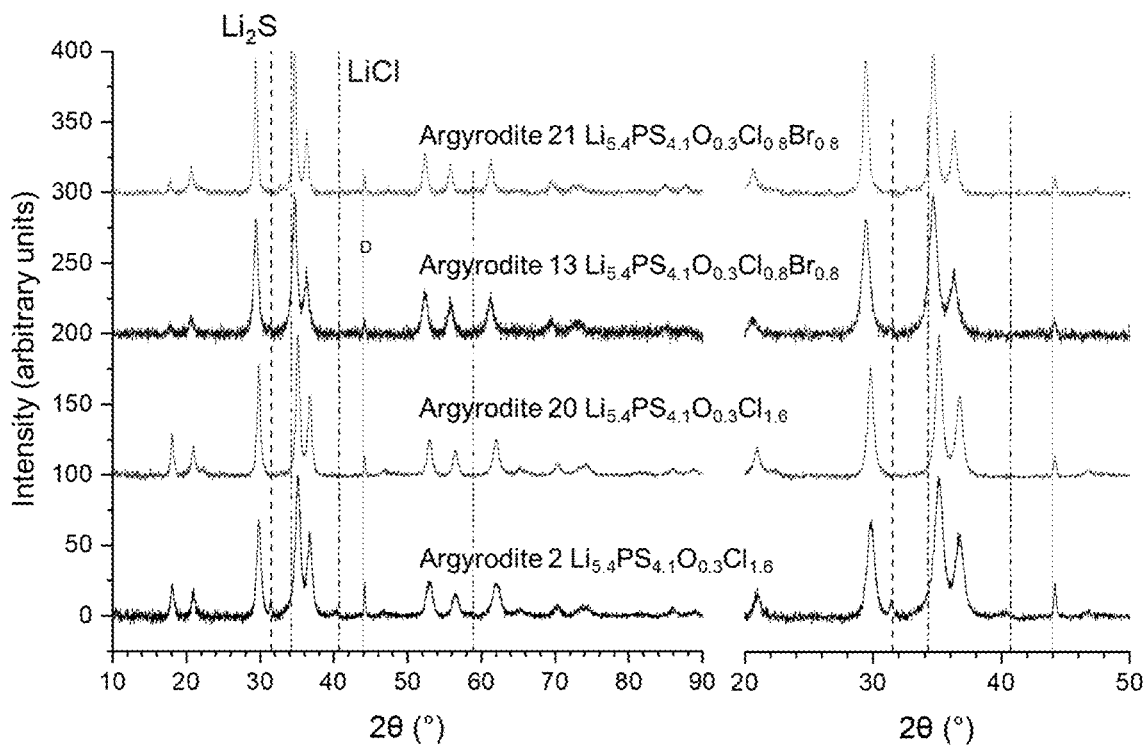
FIG. 6 presents X-ray diffraction patterns obtained for the powders of Argyrodites 2, 13, 20 and 21, as described in Example 2.

FIG. 6 presents the X-ray diffraction patterns for Argyrodites 2 and 13 obtained from the $Li_2SO_4$ precursor in small volume jars (according to Process 1 presented in Example 1) and Argyrodites 20 and 21 obtained from the $Li_2SO_4$ precursor in larger volume jars (according to Process 2 presented in Example 1). The composition of Argyrodites 2 and 20 are similar as well as those of Argyrodites 13 and 21. FIG. 5 shows that the argyrodite structure is well preserved regardless of the composition of the argyrodite and regardless of the volume of the synthesis demonstrating that the process thus described could be applied on an industrial scale.

Example 3—Nuclear Magnetic Resonance (NMR) Characterization of Inorganic Compounds Having an Argyrodite-Type Structure The composition of the argyrodites prepared in Example 1 was studied by NMR. Nuclear magnetic resonance spectra of lithium ($^6$Li NMR) and phosphorus ($^{31}$P NMR) were obtained by the MAS (magic angle spinning) technique using a Bruker Avance NEO 500 MHz spectrometer equipped with a 4 mm triple resonance probe with a maximum magic angle spinning speed of 15 kHz.

Figure 7:
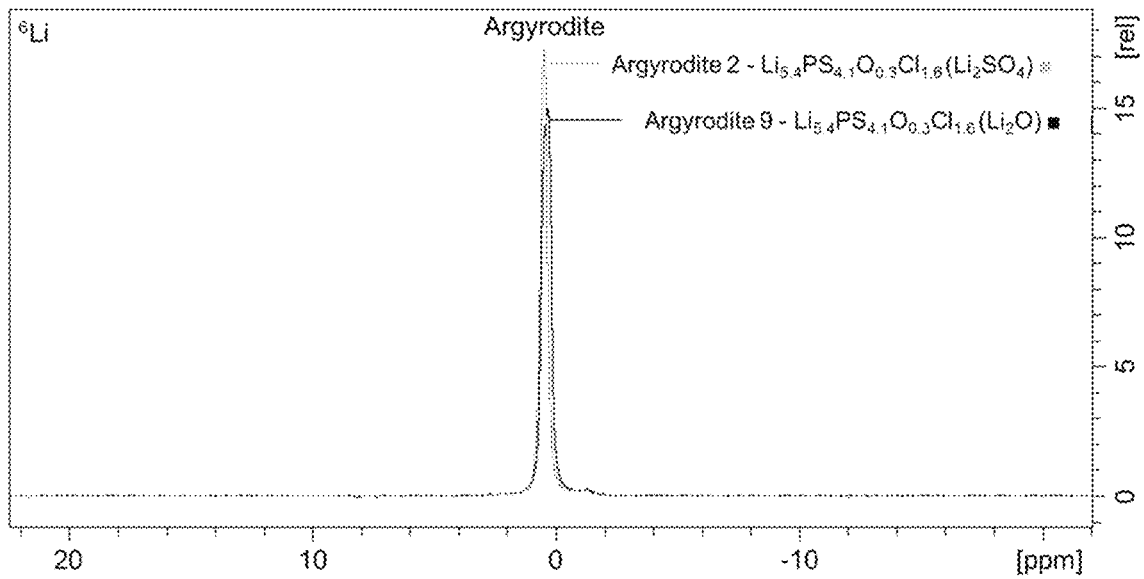
FIG. 7 presents lithium nuclear magnetic resonance ($^6$Li NMR) spectra obtained for Argyrodites 2 and 9, as described in Example 3.
Figure 8:
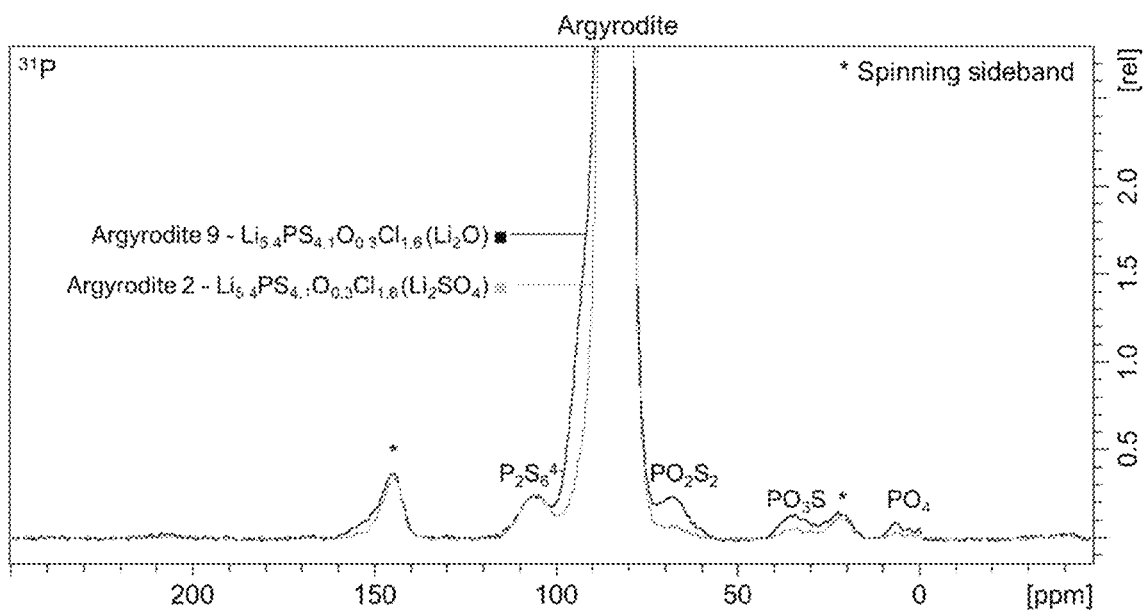
FIG. 8 presents phosphorus nuclear magnetic resonance ($^{31}$P NMR) spectra obtained for Argyrodites 2 and 9, as described in Example 3.

FIGS. 7 and 8 present $^6$Li NMR and $^{31}$P NMR spectra obtained for argyrodites of composition $Li_{5.4}PS_{4.1}O_{0.3}Cl_{1.6}$ obtained from the precursors $Li_2SO_4$ (Argyrodite 2) and $Li_2O$ (Argyrodite 9) respectively.

For the two argyrodites (Argyrodites 2 and 9), the main peak on the $^6$Li NMR spectra presented in FIG. 7 corresponds to argyrodite, while the secondary peak corresponds to LiCl residues.

For Argyrodites 2 and 9, the main peak on the $^{31}$P NMR spectra presented in FIG. 8 corresponds to argyrodite, while the secondary peaks correspond to the $P_2S_6^{4-}$, $PO_2S_2$, $PO_3S$, and $PO_4$ phases. The relative intensity of the $^{31}$P NMR peaks is indicated in Table 1.

TABLE 1

| | Relative intensity of the $^{31}$P NMR peaks | | | | |
|---|---|---|---|---|---|
| Argyrodite | Argyrodite | $P_2S_6^{4-}$ | $PO_2S_2$ | $PO_3S$ | $PO_4$ |
| Argyrodite 2 | 96.7 | 2.3 | 0.5 | 0.4 | 0.1 |
| Argyrodite 9 | 95.3 | 1.7 | 1.7 | 0.9 | 0.4 |

The relative intensity of the peaks presented in Table 1, shows that the use of $Li_2SO_4$ as a precursor (Argyrodite 2) allows to significantly reduce the formation of the $PO_2S_2$, $PO_3S$, and $PO_4$ secondary phases compared to the use of $Li_2O$ (Argyrodite 9). It is thus possible to observe that oxygen is better incorporated into the argyrodite structure thanks to the $Li_2SO_4$ precursor and thus generates less additional phases. This allows to differentiate an argyrodite synthesized from $Li_2SO_4$ from an argyrodite prepared from $Li_2O$ or any other source of oxygen as precursor.

Figure 9:
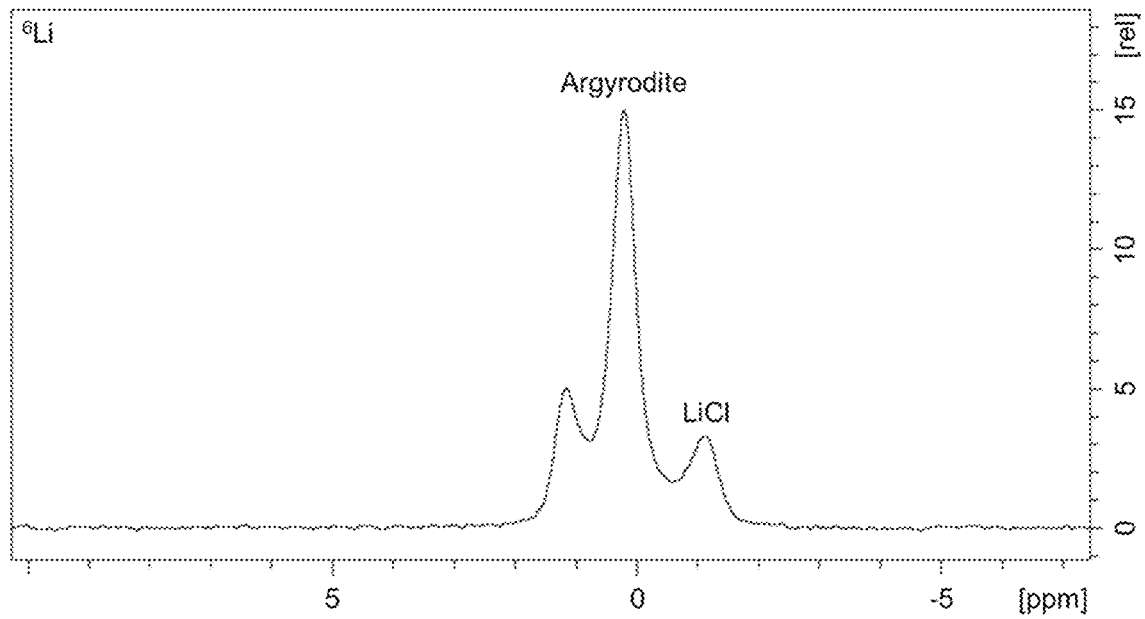
FIG. 9 presents a lithium nuclear magnetic resonance ($^6$Li NMR) spectrum obtained for Argyrodite 7, as described in Example 3.
Figure 10:
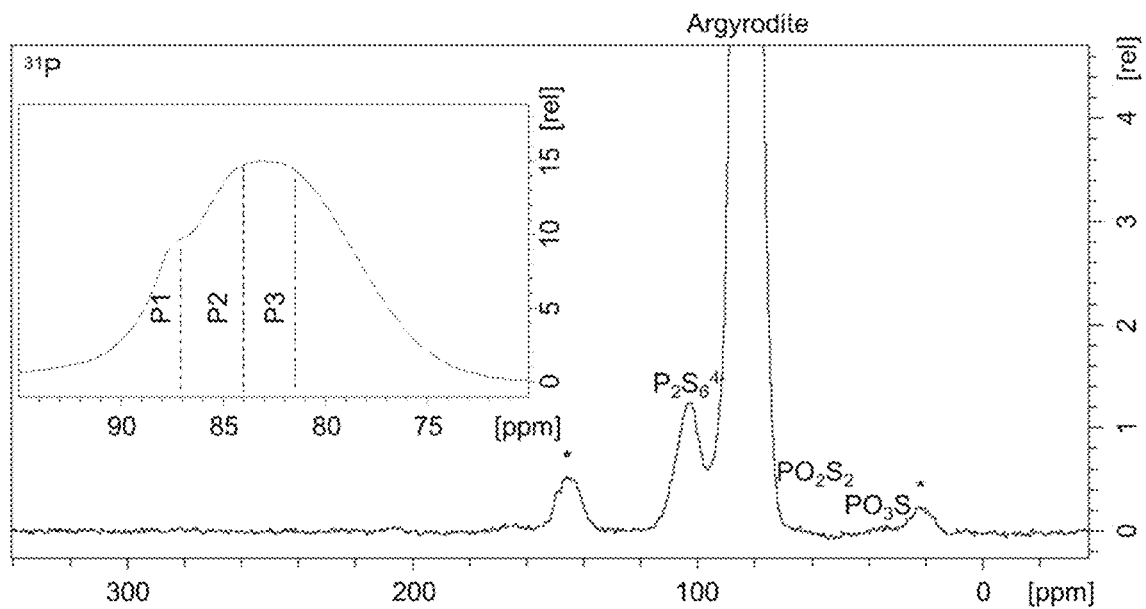
FIG. 10 presents a phosphorus nuclear magnetic resonance ($^{31}$P NMR) spectrum obtained for Argyrodite 7, as described in Example 3.

FIGS. 9 and 10 respectively present $^6$Li NMR and $^{31}$P NMR spectra obtained for the argyrodite of formula $Li_{4.8}PS_{4.1}O_{0.3}Cl_{1.6}$ obtained from $Li_2SO_4$ precursors (Argyrodite 7).

It is possible to observe on the $^6$Li NMR spectrum presented in FIG. 9 a peak at 1.2 ppm corresponding to an argyrodite phase with six lithiums and one chlorine, a second peak at 0.2 ppm corresponding to an argyrodite phase with a structure having an excess of chlorine and a third peak at −1.1 ppm corresponding to LiCl.

It is possible to observe on the $^{31}$P NMR spectrum presented in FIG. 10 a main peak corresponding to argyrodite and three secondary peaks corresponding to $P_2S_6^{4-}$, $PO_2S_2$, and $PO_3S$ phases. FIG. 10 also presents an enlargement of the main peak showing that it breaks down into three peaks corresponding to one (P1), two (P2) and three (P3) chlorines in the secondary phosphorus structure. The simultaneous excess of P1 and P3 confirms the presence of two types of argyrodites, with a low and a high chlorine fraction.

Thus, a substantial decrease in lithium content can lead to the presence of at least two argyrodite phases.

Figure 11:
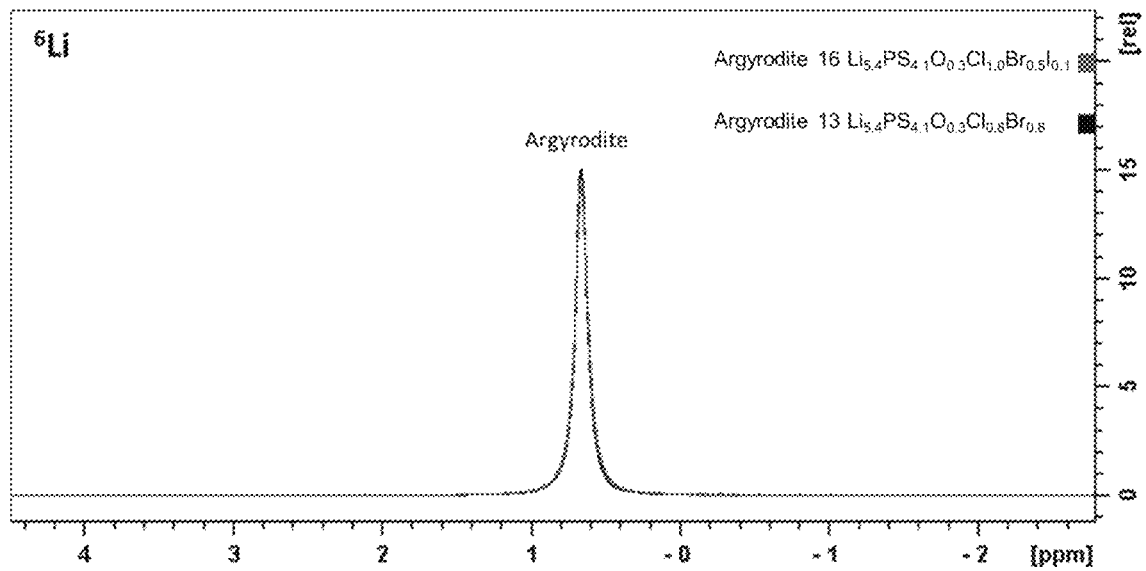
FIG. 11 presents lithium nuclear magnetic resonance ($^6$Li NMR) spectra obtained for Argyrodites 13 and 16, as described in Example 3.
Figure 12:
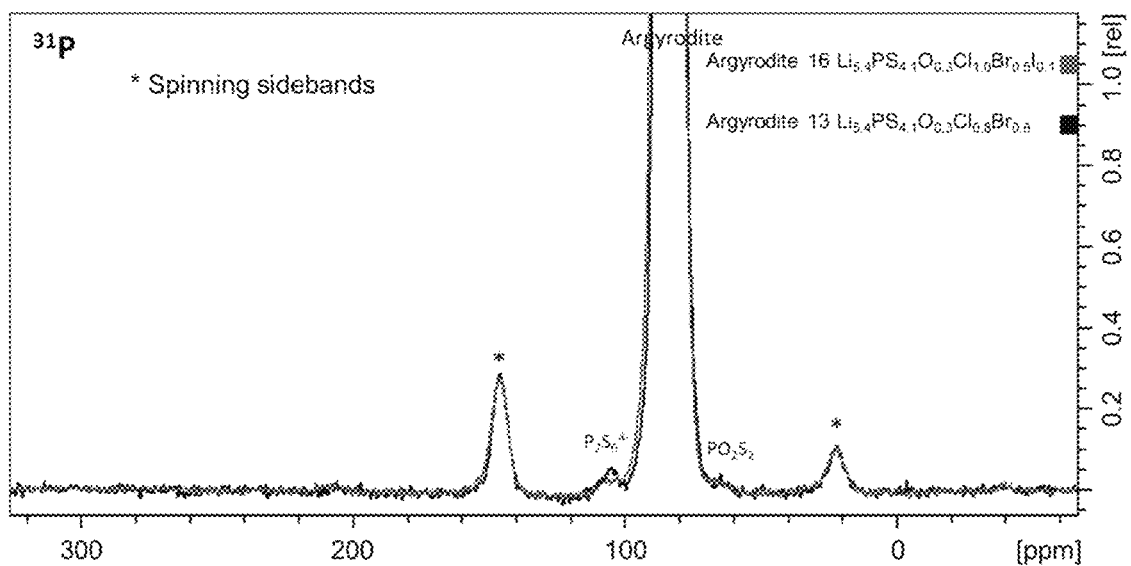
FIG. 12 presents phosphorus nuclear magnetic resonance ($^{31}$P NMR) spectra obtained for Argyrodites 13 and 16, as described in Example 3.

FIGS. 11 and 12 respectively present $^6$Li NMR and $^{31}$P NMR spectra obtained for the argyrodites of formula $Li_{5.4}PS_{4.1}O_{0.3}Cl_{0.8}Br_{0.8}$ (Argyrodite 13) and of formula $Li_{5.4}PS_{4.1}O_{0.3}Cl_{1.0}Br_{0.5}I_{0.1}$ (Argyrodite 16) obtained from the $Li_2SO_4$ precursor. The main peak on the $^6Li$ NMR spectra presented in FIG. 11 corresponds to argyrodite. It is possible to observe on the $^{31}P$ NMR spectra presented in FIG. 12 a main peak corresponding to argyrodite and the presence of weak secondary peaks corresponding to $P_2S_6^{4-}$, and $PO_2S_2$ phases. This confirms the results obtained by X-ray diffraction, namely the obtention of a pure oxidized argyrodite phase from $Li_2SO_4$ regardless of the halide composition.

Example 4—Generation of $H_2S$ Upon Exposure to Air of Inorganic Compounds Having an Argyrodite-Type Structure Safety tests were performed to evaluate the impact of the argyrodite on $H_2S$ generation. About 10 mg (±3 mg) of argyrodite powder was placed in a sealed cell under an inert atmosphere.

An air stream was introduced into the sealed cell at a flow rate of approximately 0.3 L/min, at a controlled temperature of about 24.5° C. (±0.5° C.) and a controlled humidity of 50% (±5%). The concentration of $H_2S$ gas generated was measured about every 15 seconds with a previously calibrated multi-gas detector (MSA ALTAIR™ 5x) placed at the cell outlet. From these data, the volume of $H_2S$ gas generated normalized by the mass of argyrodite was calculated.

Figure 13:
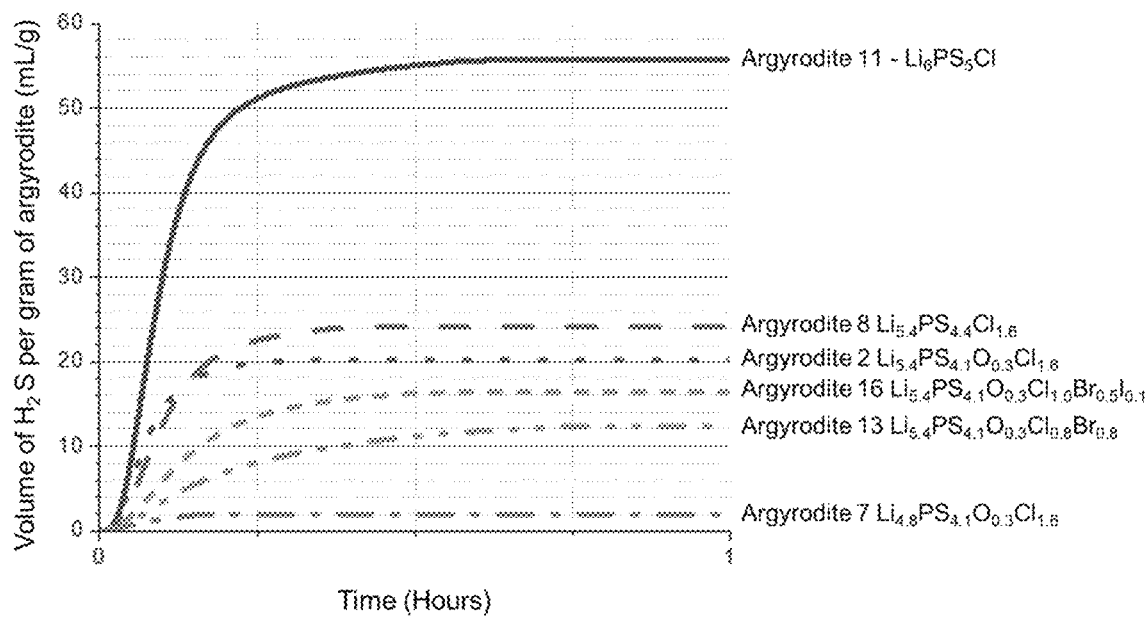
FIG. 13 shows a plot of the volume of gaseous $H_2S$ normalized by the mass of argyrodite generated as a function of time for Argyrodites 2, 7, 8, 11, 13 and 16, as described in Example 4.

The results of these analyses are presented in FIG. 13. FIG. 13 shows a graph of the volume of $H_2S$ gas generated per gram of argyrodite powder (mL/g) versus time (hours) for Argyrodites 2 ($Li_{5.4}PS_{4.1}O_{0.3}Cl_{1.6}$) (dotted line), 7 ($Li_{4.8}PS_{4.1}O_{0.3}Cl_{1.6}$) (dash-dotted line), 8 ($Li_{5.4}PS_{4.4}Cl_{1.6}$) (dashed line), 11 ($Li_6PS_5Cl$) (solid line), 13 ($Li_{5.4}PS_{4.1}O_{0.3}Cl_{0.8}Br_{0.8}$) (dash-dot-dot line) and 16 ($Li_{5.4}PS_{4.1}O_{0.3}Cl_{1.0}Br_{0.5}I_{0.1}$) (small dash line) prepared in Example 1.

It is possible to observe that a classical argyrodite of the $Li_6PS_5Cl$ type (Argyrodite 11) generates a substantially higher volume of $H_2S$ gas than a chlorine doped argyrodite of the $Li_{5.4}PS_{4.4}Cl_{1.6}$ type (Argyrodite 8), demonstrating the interest of chlorine doping on safety. It is also possible to observe that argyrodites based on the $Li_2SO_4$ precursor also allow to decrease the volume of $H_2S$ gas as it is the case for the argyrodite $Li_{5.4}PS_{4.1}O_{0.3}Cl_{1.6}$ (Argyrodite 2). The addition of bromine and/or iodine from the previous composition while keeping the same oxygen and lithium content allows to decrease again the $H_2S$ generation. Finally, FIG. 13 shows that an argyrodite-type structure generated from the $Li_2SO_4$ precursor with a significant decrease of lithium (Argyrodite 7) allows to further reduce the volume of $H_2S$ gas generated, and thus, to improve the safety while reducing the production costs by a lower amount of $Li_2S$ used and by the absence or decrease of the annealing step.

Example 5—Ionic Conductivity of Inorganic Compounds Having an Argyrodite-Type Structure a) Preparation of Symmetric Cells for Ionic Conductivity Measurements Symmetric cells were assembled according to the following procedure in order to measure the ionic conductivity of the inorganic compounds having an argyrodite-type structure prepared in Example 1.

Pellets were prepared by compressing 160 mg of the powder of the inorganic compound having an argyrodite-type structure prepared in Example 1 between two stainless steel electrodes under a pressure of 360 MPa. The pellets placed between two stainless steel electrodes were then assembled in sealed conductivity cells closed in a glove box under an inert atmosphere maintained at a pressure of 20 MPa.

The symmetric cells were assembled in the configurations indicated in Table 2.

TABLE 2

Symmetric cells configurations

| Symmetric cell | Argyrodite | Argyrodite | Value of t | Value of w | Value of z | Value of y |
|---|---|---|---|---|---|---|
| Cell 1 | Argyrodite 1 | $Li_{5.4}PS_{4.3}O_{0.1}Cl_{1.6}$ | 1.6 | 0 | 0 | 0.1 |
| Cell 2 | Argyrodite 2 | $Li_{5.4}PS_{4.1}O_{0.3}Cl_{1.6}$ | 1.6 | 0 | 0 | 0.3 |
| Cell 3 | Argyrodite 3 | $Li_{5.4}PS_{3.9}O_{0.5}Cl_{1.6}$ | 1.6 | 0 | 0 | 0.5 |
| Cell 4 | Argyrodite 4 | $Li_{5.4}PS_{3.65}O_{0.75}Cl_{1.6}$ | 1.6 | 0 | 0 | 0.75 |
| Cell 5 | Argyrodite 5 | $Li_{5.7}PS_{4.4}O_{0.3}Cl_{1.3}$ | 1.3 | 0 | 0 | 0.3 |
| Cell 6 | Argyrodite 6 | $Li_{5.1}PS_{4.4}O_{0.3}Cl_{1.3}$ | 1.3 | 0 | 0 | 0.3 |
| Cell 7 | Argyrodite 7 | $Li_{4.8}PS_{4.1}O_{0.3}Cl_{1.6}$ | 1.6 | 0 | 0 | 0.3 |
| Cell 8 (Comparative cell) | Argyrodite 8 | $Li_{5.4}PS_{4.4}Cl_{1.6}$ | 1.6 | 0 | 0 | 0 |
| Cell 9 (Comparative cell) | Argyrodite 9 | $Li_{5.4}PS_{4.1}O_{0.3}Cl_{1.6}$ | 1.6 | 0 | 0 | 0.3 |
| Cell 10 (Comparative cell) | Argyrodite 10 | $Li_{5.4}PS_{3.9}O_{0.5}Cl_{1.6}$ | 1.6 | 0 | 0 | 0.5 |
| Cell 12 | Argyrodite 12 | $Li_{5.4}PS_{4.1}O_{0.3}Cl_{1.0}Br_{0.6}$ | 1.0 | 0 | 0.6 | 0.3 |
| Cell 13 | Argyrodite 13 | $Li_{5.4}PS_{4.1}O_{0.3}Cl_{0.8}Br_{0.8}$ | 0.8 | 0 | 0.8 | 0.3 |
| Cell 14 | Argyrodite 14 | $Li_{5.4}PS_{4.1}O_{0.3}Cl_{0.8}Br_{1.0}$ | 0.6 | 0 | 1.0 | 0.3 |
| Cell 15 | Argyrodite 15 | $Li_{5.4}PS_{4.1}O_{0.3}Br_{1.6}$ | 0 | 0 | 1.6 | 0.3 |
| Cell 16 | Argyrodite 16 | $Li_{5.4}PS_{4.1}O_{0.3}Cl_{1.0}Br_{0.5}I_{0.1}$ | 1.0 | 0.1 | 0.5 | 0.3 |
| Cell 17 | Argyrodite 17 | $Li_{5.4}PS_{4.1}O_{0.3}Cl_{0.75}Br_{0.75}I_{0.1}$ | 0.75 | 0.1 | 0.75 | 0.3 |
| Cell 18 | Argyrodite 18 | $Li_{5.4}PS_{4.1}O_{0.3}Cl_{0.7}Br_{0.7}I_{0.2}$ | 0.7 | 0.2 | 0.7 | 0.3 |
| Cell 19 | Argyrodite 19 | $Li_{5.4}PS_{4.1}O_{0.3}Cl_{1.0}Br_{0.4}I_{0.2}$ | 1.0 | 0.2 | 0.4 | 0.3 |
| Cell 20 | Argyrodite 20 | $Li_{5.4}PS_{4.1}O_{0.3}Cl_{1.6}$ | 1.6 | 0 | 0 | 0.3 |
| Cell 21 | Argyrodite 21 | $Li_{5.4}PS_{4.1}O_{0.3}Cl_{0.8}Br_{0.8}$ | 0.8 | 0 | 0.8 | 0.3 | b) Measurement of the Ionic Conductivity of the Symmetrical Cells

Ionic conductivity measurements of the symmetric cells assembled in Example 5(a) were carried out with a VMP-300 multi-channel potentiostat (BioLogic). Measurements were carried out in the frequency range of from 7 MHz to 200 mHz under an amplitude of 50 mV in a temperature range of from −10° C. to 70° C. (in increase and in decrease, each 10° C.).

Each ionic conductivity measurement was obtained after an oven temperature stabilization of about one hour at the temperature. The ionic conductivity was extracted as a function of the equivalent circuit used to extract the resistance associated with the measured pellet. The straight lines were obtained for the symmetric cells prepared in Example 5(a). The slope of these lines corresponds to the activation energy and has a value of about 0.3 eV.

Figure 14:
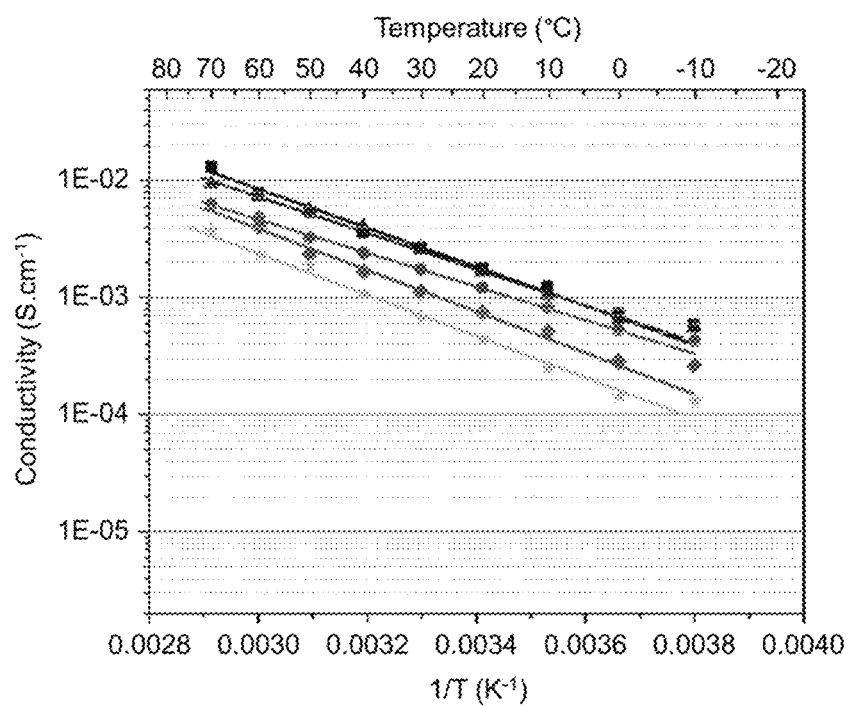
FIG. 14 is a graph showing ionic conductivity results as a function of temperature for Cells 1 (●), 2 (▲), 3 (♦), 4 (★) and 8 (■), as described in Example 5(b).

FIG. 14 presents the measured ionic conductivity results as a function of temperature for Cells 1 (●), 2 (▲), 3 (◆), 4 (★), and 8 (■). It can be observed in FIG. 14 that the ionic conductivity of the most oxygen-poor argyrodites (y≤0.3) (Cells 1 and 2) is similar to that of the oxide-free argyrodite (Cell 8). A decrease in conductivity is observed for the most oxygen-rich argyrodite (y>0.3) (Cells 3 and 4). It should be noted that the ionic conductivity of the argyrodite of formula $Li_{5.4}PS_{4.1}O_{0.3}Cl_{1.6}$ (Cell 2) prepared from $Li_2SO_4$ is substantially identical to that of oxide-free argyrodite (Cell 8).

Figure 15:
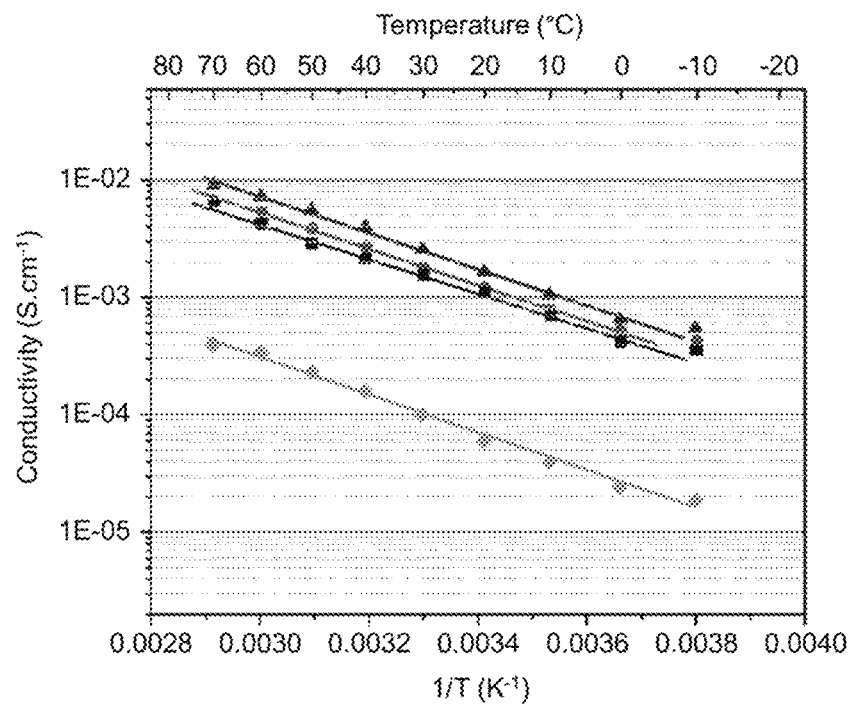
FIG. 15 is a graph showing ionic conductivity results as a function of temperature for Cells 2 (▲), 5 (■), 6 (●) and 7 (♦), as described in Example 5(b).

FIG. 15 presents the ionic conductivity results measured as a function of the temperature for Cells 2 (▲), 5 (■), 6 (●), and 7 (◆). FIG. 15 shows substantially similar ionic conductivity values for Cells 5 and 6 comprising Argyrodites 5 and 6, respectively (t=1.3 and y=0.3) obtained by two different syntheses (Equations (3) and (4), respectively). For t=1.6 and y=0.3, FIG. 15 also shows substantially lower ionic conductivity values for Cell 7 comprising Argyrodite 7 compared to those of Cell 2 comprising Argyrodite 2. As it can be observed, thanks to the $Li_2SO_4$ precursor, it is possible to modulate the composition (for example, the lithium, oxygen and sulfur contents) of a lithium oxysulfide argyrodite while remaining substantially in the same range of ionic conductivity. It is also possible to observe that a significant lithium deficiency induces a reduction in ionic conductivity.

Figure 16:
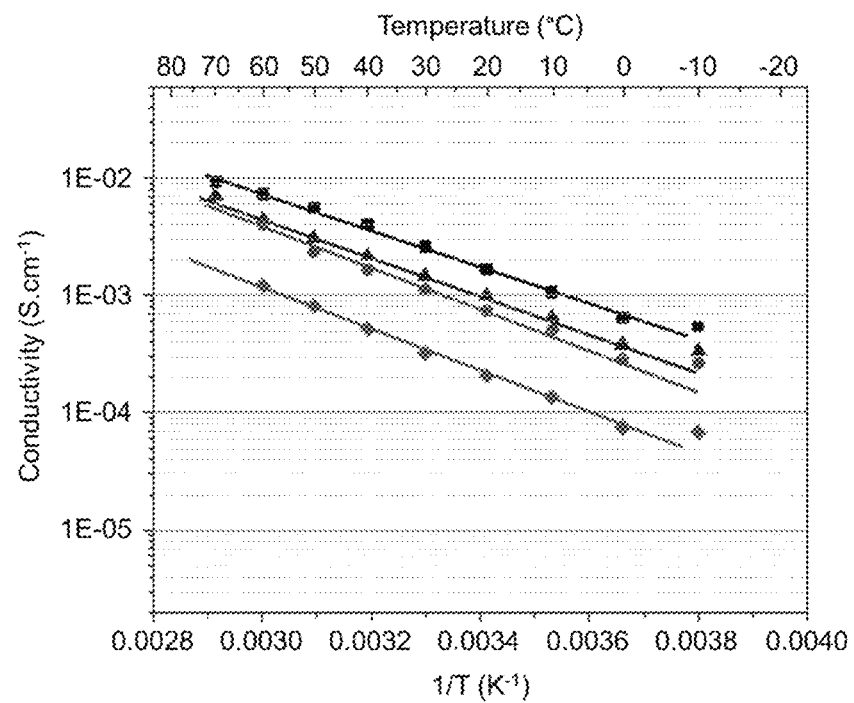
FIG. 16 is a graph showing ionic conductivity results as a function of temperature for Cells 2 (■), 3 (●), 9 (▲) and 10 (♦), as described in Example 5(b).

FIG. 16 presents the ionic conductivity results measured as a function of the temperature for Cells 2 (■), 3 (●), 9 (▲), and 10 (◆). FIG. 16 shows that for the same composition, the ionic conductivity of argyrodites obtained from the $Li_2SO_4$ precursor (Argyrodites 2 and 3) is significantly higher than that of argyrodites obtained from the $Li_2O$ precursor (Argyrodites 9 and 10). As shown in FIG. 8, the use of $Li_2SO_4$ type precursor allows a better incorporation of oxygen within the argyrodite structure and this translates into an increase in conductivity as demonstrated by the results in FIG. 16.

Figure 17:
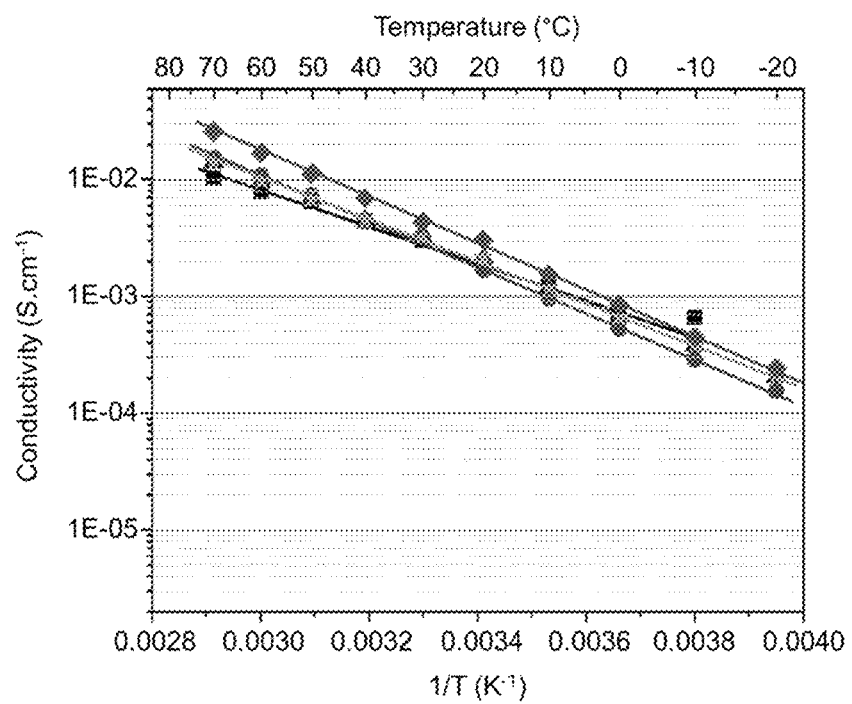
FIG. 17 is a graph showing ionic conductivity results as a function of temperature for Cells 2 (■), 12 (●), 13 (▲), 14 (♦) and 15 (★), as described in Example 5(b).

FIG. 17 presents the ionic conductivity results measured as a function of the temperature for Cells 2 (■), 12 (●), 13 (▲), 14 (◆), and 15 (★). FIG. 17 shows that the modulation of the composition from the two halogens (i.e., chlorine and bromine) does not substantially modify the ionic conductivity and does so while maintaining high conductivities. It is to be noted that Argyrodite 14 shows the best conductivity.

Figure 18:
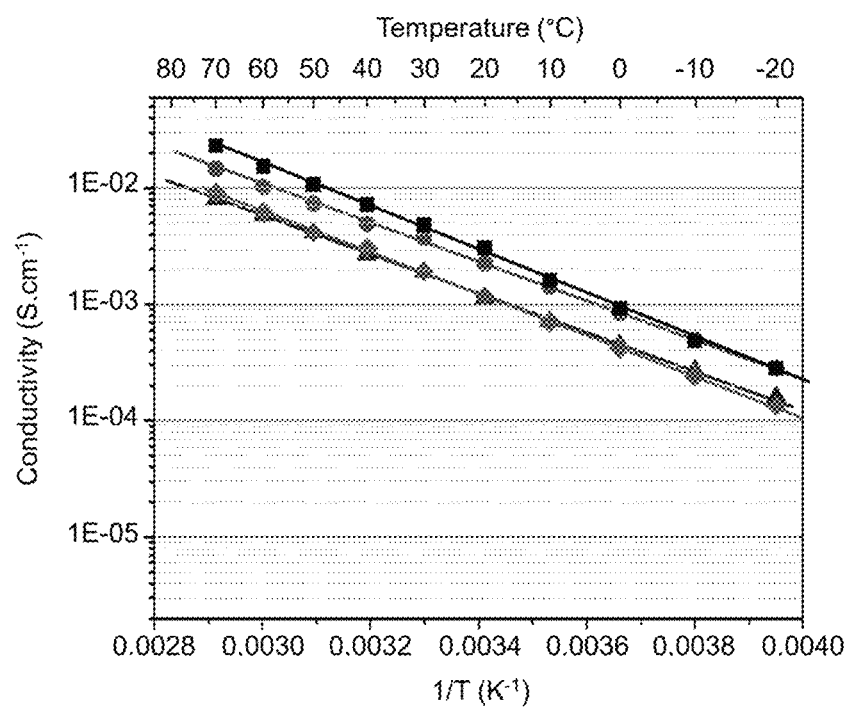
FIG. 18 is a graph showing ionic conductivity results as a function of temperature for Cells 16 (■), 17 (●), 18 (▲) and 19 (♦), as described in Example 5(b).

FIG. 18 presents the ionic conductivity results measured as a function of the temperature for Cells 16 (■), 17 (●), 18 (▲), and 19 (◆). FIG. 18 shows that the incorporation of the three halogens (i.e., chlorine, bromine, and iodine) in the presence of $Li_2SO_4$ does not substantially modify the ionic conductivity and does so while maintaining high conductivities. It can be observed that an iodine content of 0.1 allows to obtain better conductivity than a higher content.

Thus, by cumulating the different analyses, thanks to the $Li_2SO_4$ precursor, it is possible to obtain oxysulfurized argyrodites presenting the same ionic conductivities as those without oxide and improved compared to the use of the $Li_2O$ precursor. Moreover, it is possible to modulate the composition of the $Li_2SO_4$-based argyrodites with different halide contents and types while maintaining a high ionic conductivity. In addition, this modulation allows to improve the safety while keeping good conduction properties.

Figure 19:
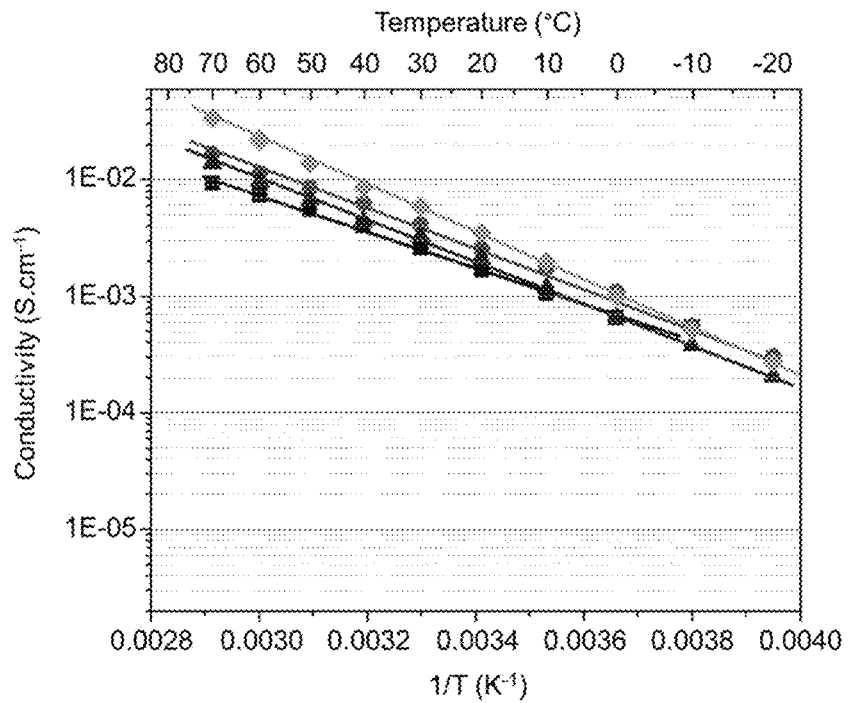
FIG. 19 is a graph showing ionic conductivity results as a function of temperature for Cells 2 (■), 20 (●), 13 (▲) and 21 (♦), as described in Example 5(b).

FIG. 19 presents the ionic conductivity results measured as a function of the temperature for Cells 2 (■), 20 (●), 13 (▲), and 21 (◆). FIG. 19 shows that regardless of the composition of the $Li_2SO_4$-based argyrodite, the increase in synthesis volume slightly increases the ionic conductivity. This demonstrates that the proposed solutions can be readily applicable on an industrial scale without loss of performance.

Example 6—Electrochemical Stability of Inorganic Compounds Having an Argyrodite-Type Structure a) Preparation of Pseudo-Batteries for Electrochemical Stability Measurements Pseudo-batteries were assembled according to the following procedure to determine the electrochemical stability of Argyrodites 2 and 9 prepared in Example 1.

5% by weight of VGCFs were mixed with 95% by weight of Argyrodites 2 and 9 to obtain composite positive pseudo-electrodes, and thus observe oxidation-reduction reactions substantially representative of the final composite positive electrode compositions that can be used in a battery configuration.

Solid electrolytes composed of the same argyrodites were then placed on the surface of the composite positive pseudo-electrodes. Metallic lithium negative electrodes were then deposited on the surface of the solid electrolytes.

The assemblies comprising a composite positive pseudo-electrode, a solid electrolyte, and a metallic lithium negative electrode were then compressed and assembled in sealed cells in a glove box under an inert atmosphere.

The pseudo-batteries were assembled in the configurations presented in Table 3.

TABLE 3

| | | Pseudo-battery configurations | | |
|---|---|---|---|---|
| | | Composition of the composite positive pseudo-electrode | Composition of | |
| Pseudo-battery | Argyrodite | Electronically conductive material | the argyrodite of the solid electrolyte | Composition of the negative electrode |
| Cell 22 | $Li_{5.4}PS_{4.1}O_{0.3}Cl_{1.6}$ (Argyrodite 2) 95 wt. % | VGCFs 5 wt. % | $Li_{5.4}PS_{4.1}O_{0.3}Cl_{1.6}$ (Argyrodite 2) | Metallic lithium |

TABLE 3-continued

Pseudo-battery configurations

| Pseudo-battery | Composition of the composite positive pseudo-electrode | | Composition of the argyrodite of the solid electrolyte | Composition of the negative electrode |
| --- | --- | --- | --- | --- |
| | Argyrodite | Electronically conductive material | | |
| Cell 23 (Comparative Cell) | $Li_{5.4}PS_{4.1}O_{0.3}Cl_{1.6}$ (Argyrodite 9) 95 wt. % | VGCFs 5 wt. % | $Li_{5.4}PS_{4.1}O_{0.3}Cl_{1.6}$ (Argyrodite 9) | Metallic lithium | b) Cyclic Voltammetry

The electrochemical oxidation stability of the pseudo-batteries as described in Example 6(a) was measured using a VMP-300 multi-channel potentiostat (BioLogic).

Figure 20:
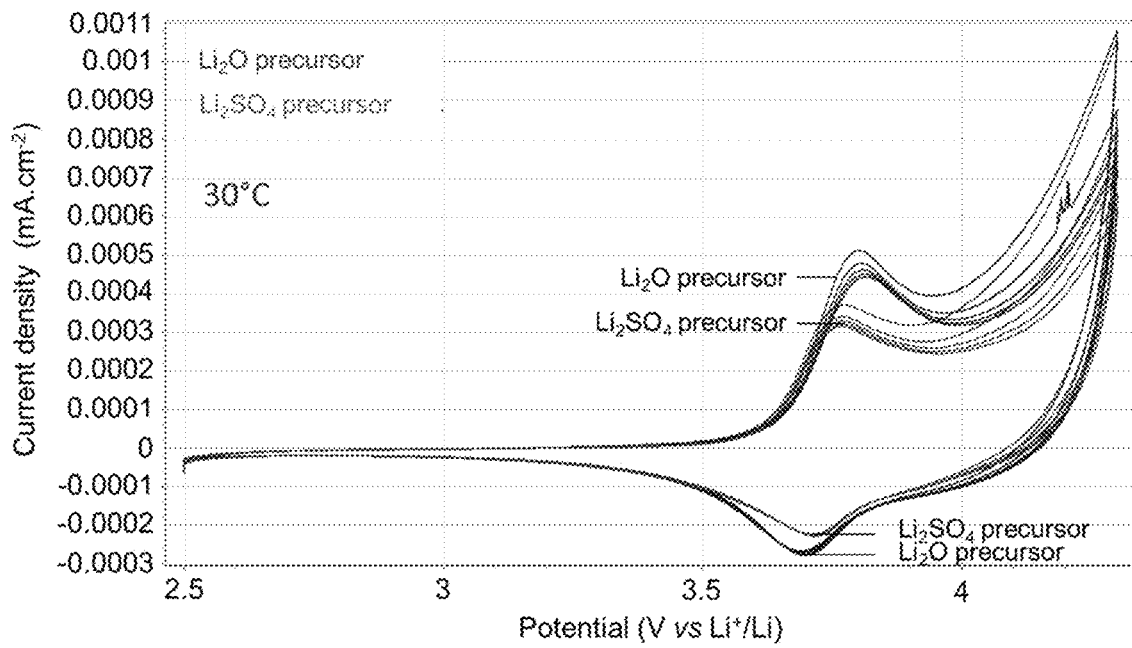
FIG. 20 presents cyclic voltammograms obtained for Cells 22 and 23 recorded at a scan rate of 0.05 mV/s between 2.5 V and 4.2 V vs. Li/Li$^+$ at a temperature of about 30° C., as described in Example 6(b).

FIG. 20 presents the cyclic voltammetry results obtained for Cell 22 and for Cell 23 (comparative battery) recorded at a scan rate of 0.05 mV/s in the lithium nickel manganese cobalt oxide (NMC) potential range, i.e., between 2.5 V and 4.3 V vs. Li/Li+ at a temperature of about 30° C. FIG. 20 presents the results obtained during the first four cycles for each of the two pseudo-batteries.

FIG. 20 shows that no reaction with lithium metal could be observed, demonstrating the chemical and electrochemical stability of the argyrodites with lithium metal. In the NMC potential range, it is possible to observe a weak oxidation-reduction reaction for both pseudo-batteries, with a lower current density generated for Cell 22 comprising the argyrodite obtained using $Li_2SO_4$ as a precursor (0.3 μA/cm2) and a lower polarization hysteresis. It is also possible to observe that this reaction is reversible. The argyrodites would thus be substantially electrochemically stable in the NMC potential range with substantially improved electrochemical stability for the argyrodite obtained using $Li_2SO_4$ as a precursor. Thus, the argyrodite obtained using $Li_2SO_4$ as a precursor is substantially stable over the entire potential range of a lithium metal battery.

Example 7—Electrochemical Properties of Inorganic Compounds Having an Argyrodite-Type Structure The electrochemical properties of the Argyrodite 2 prepared in Example 1 were studied.

a) Preparation of the Composite Positive Electrode Material

35% by weight of Argyrodite 2 powder prepared in Example 1 was mixed with 65% by weight of $LiNi_{0.6}Mn_{0.2}Co_{0.2}O_2$ particles (NMC 622) and 5% by weight of a mixture of Li400 carbon black (Denka™) and VGCFs (75:25 mass ratio). The dry powders were mixed using a vortex mixer and then mixed with a mortar to homogenize the composite positive electrode material.

b) Electrochemical Cell Configuration (Cell 24)

The electrochemical cell was assembled according to the following procedure.

A solid electrolyte was prepared by placing 80 mg of the Argyrodite 2 powder prepared in Example 1 in a 10 mm diameter mold under a pressure of 200 MPa. 13 mg of the composite positive electrode material prepared in Example 7(a) was then added into the mold over the solid electrolyte followed by an aluminum current collector. The contents of the mold including the solid electrolyte layer, the composite positive electrode layer and the aluminum current collector were then compressed under a pressure of 360 MPa for about 10 minutes. A 10 mm diameter metallic lithium electrode on a stainless-steel current collector was then added facing the solid electrolyte layer and the assembly was compressed under a pressure of 120 MPa for about 5 minutes.

The electrochemical cell was then assembled in a sealed cycling cell closed in a glove box under an inert atmosphere maintained at a pressure of 20 MPa.

c) Electrochemical Behavior of the Electrochemical Cell

Cell 24 assembled in Example 7(b) was cycled between 2.5 V and 4.3 V vs. Li/Li+. The first five cycles were performed at C/10, followed by four cycles at C/4, and then the aging experiments were performed at a constant charge and discharge current of C/2 at a temperature of 30° C. for a surface capacity of 1.8 mAh/cm².

Figure 21:
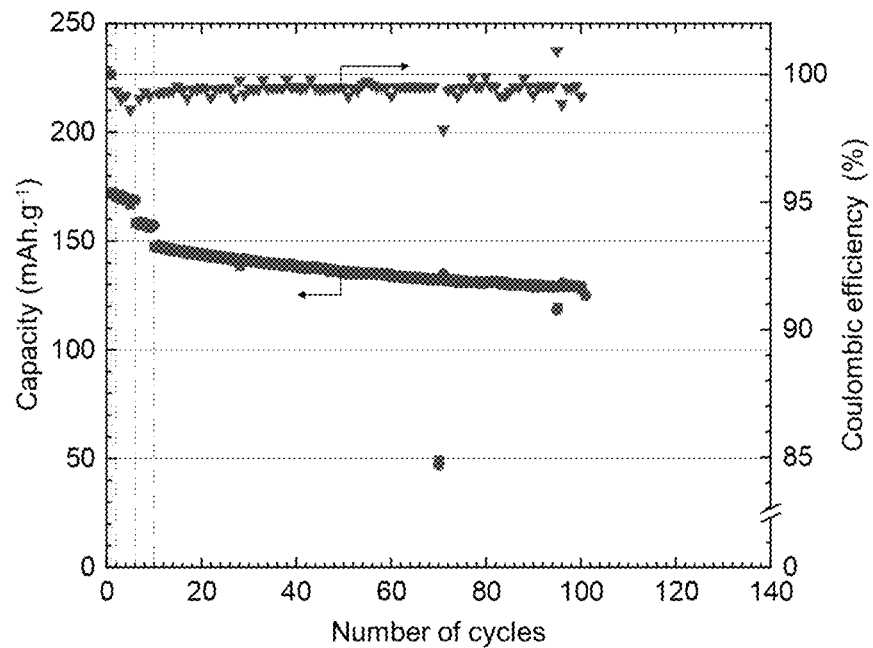
FIG. 21 shows a graph of the charge (●) and discharge capacity (■) and the coulombic efficiency (▲) as a function of the number of cycles for 100 cycles obtained for Cell 24, as described in Example 7(c).

FIG. 21 shows a graph of the charge (●) and discharge (■) capacity and coulombic efficiency (▲) as a function of the number of cycles for 100 cycles.

Figure 22:
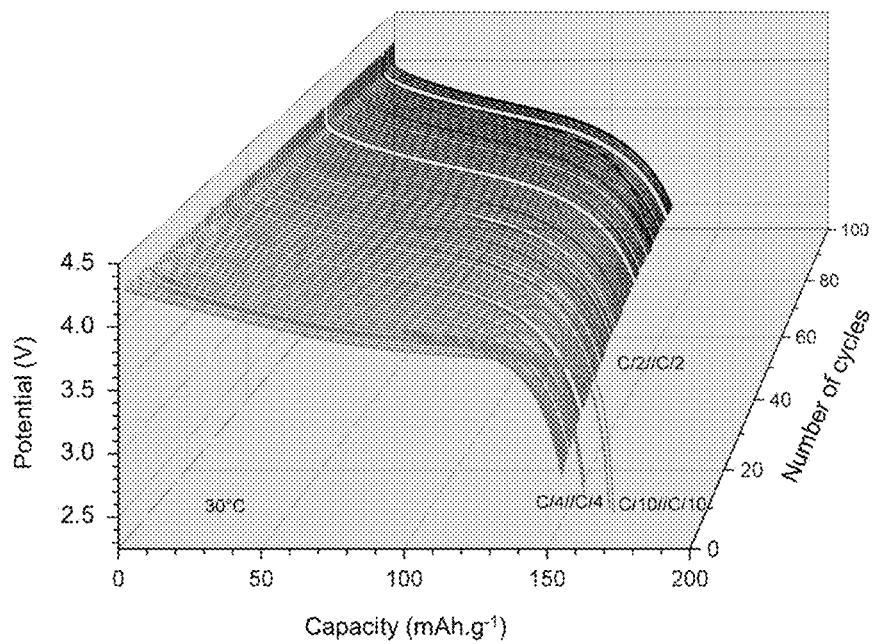
FIG. 22 presents the discharge profiles obtained for Cell 24 as a function of the capacity obtained at charge and discharge currents of C/10, C/4 and C/2 and recorded vs. Li/Li$^+$ at a temperature of 30° C., as described in Example 7(c).
Figure 23:
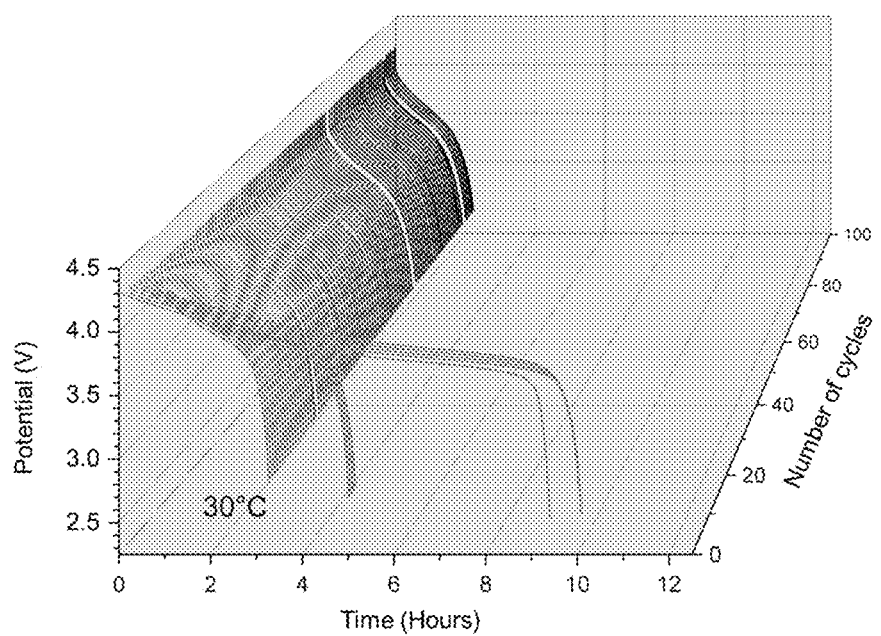
FIG. 23 presents the discharge profiles obtained for Cell 24 as a function of time obtained at charge and discharge currents of C/10, C/4 and C/2 and recorded vs. Li/Li$^+$ at a temperature of 30° C., as described in Example 7(c).

FIGS. 22 and 23 show the discharge profiles at different charge and discharge currents. More particularly, FIGS. 22 and 23 respectively show a graph of the potential as a function of the discharge capacity and time in hours.

It is possible to observe that at C/10, C/4, and C/2 the electrochemical cell provides a capacity of about 170 mAh·g⁻¹, 160 mAh·g⁻¹, and 150 mAh·g⁻¹, respectively.

It is possible to observe a substantial capacity retention after 100 cycles, allowing for stable aging performance as demonstrated in FIG. 22. It is possible to observe adequate cyclability of the electrochemical cell at C/2 in charge and discharge at a temperature of 30° C. demonstrating the good electrochemical stability of Argyrodite 2 in potential and with respect to the electronically conductive material (i.e., the mixture of Li400 carbon black and VGCFs) and electrochemically active material (i.e., NCM).

Several modifications could be made to any of the above-described embodiments without departing from the scope of the present invention as contemplated. The references, patents or scientific literature documents referred to in the present application are incorporated herein by reference in their entirety for all purposes.

What is claimed is:

1. A process for preparing an inorganic compound having an argyrodite-type structure based on an alkali metal, the process comprising:
   a step of grinding sulfide of the alkali metal, sulfate of the alkali metal, phosphorus pentasulfide and a halide of the alkali metal, wherein the alkali metal is lithium, sodium, or potassium, the inorganic compound having an argyrodite-type structure is of formula $M_{6-x-2y}PS_{5-x-y}O_yZ_{1+x}$, M is the alkali metal selected from lithium, sodium, or potassium, Z is a halogen atom selected from fluoride, chloride, bromide, and iodide, x is a number such that 0≤x≤1 and represents the number of Z in excess of 1 or is equal to zero, and y is a number such that 0<y≤1.

2. The process of claim 1, wherein the halide of the alkali metal is selected from the fluoride of the alkali metal, the chloride of the alkali metal, the bromide of the alkali metal, the iodide of the alkali metal, and a mixture of at least two thereof.

3. The process of claim 1, wherein the inorganic compound having argyrodite-type structure is selected from inorganic compounds having an argyrodite-type structure of formulae $M_{5.2}PS_{4.3}O_{0.1}Cl_{1.6}$, $M_{5.1}PS_{4.4}O_{0.3}Cl_{1.3}$, and $M_{4.8}PS_{4.1}O_{0.3}Cl_{1.6}$.

4. The process of claim 1, wherein the inorganic compound having argyrodite-type structure is selected from inorganic compounds having an argyrodite-type structure of formulae $Li_{5.2}PS_{4.3}O_{0.1}Cl_{1.6}$, $Li_{5.1}PS_{4.4}O_{0.3}Cl_{1.3}$, and $Li_{4.8}PS_{4.1}O_{0.3}Cl_{1.6}$.

5. The process of claim 1, which is free of an annealing step.

6. The process of claim 2, wherein the halide of the alkali metal is the chloride of the alkali metal, the bromide of the alkali metal, the iodide of the alkali metal, a mixture of the chloride of the alkali metal and the bromide of the alkali metal, or a mixture of the chloride of the alkali metal, the bromide of the alkali metal, and the iodide of the alkali metal.

* * * * *